US012719350B2

(12) United States Patent
Naito et al.

(10) Patent No.: US 12,719,350 B2
(45) Date of Patent: Aug. 25, 2026

(54) POWER SUPPLY CONTROL DEVICE AND POWER SUPPLY CONTROL METHOD

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Kazutaka Naito, Yokkaichi (JP); Kota Oda, Yokkaich (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 344 days.

(21) Appl. No.: 18/563,121

(22) PCT Filed: Mar. 28, 2022

(86) PCT No.: PCT/JP2022/015102
§ 371 (c)(1),
(2) Date: Nov. 21, 2023

(87) PCT Pub. No.: WO2022/249728
PCT Pub. Date: Dec. 1, 2022

(65) Prior Publication Data

US 2024/0275266 A1 Aug. 15, 2024

(30) Foreign Application Priority Data

May 27, 2021 (JP) ................................ 2012-089281

(51) Int. Cl.
*H02M 1/088* (2006.01)
*H02M 3/155* (2006.01)

(52) U.S. Cl.
CPC .......... *H02M 1/088* (2013.01); *H02M 3/155* (2013.01)

(58) Field of Classification Search
CPC .............................. H02M 1/088; H02M 3/155
(Continued)

(56) References Cited

U.S. PATENT DOCUMENTS 11,130,457 B2 * 9/2021 Nakao .................... H02J 1/084
2011/0010051 A1 * 1/2011 Ura ..................... B62D 5/0487
701/41

(Continued)

FOREIGN PATENT DOCUMENTS

JP 2009-023421 A 2/2009
JP 2014-177229 A 9/2014
JP 2018-129762 A 8/2018

OTHER PUBLICATIONS

International Search Report, Application No. PCT/JP2022/015102, mailed May 17, 2022. ISA/Japan Patent Office.

*Primary Examiner* — Yemane Mehari
(74) *Attorney, Agent, or Firm* — Brooks Kushman P.C.

(57) ABSTRACT

A power supply control device controls power supplied via a power supply switch. An IPD turns the power supply switch on or off. A first power supply controller transmits an ON signal and an OFF signal a first device communication line. The ON signal instructs to turn on the power supply switch. The OFF signal instructs to turn off the power supply switch. If the first power supply controller determines that communication via the first device communication line is interrupted, a second power supply controller transmits the ON signal and the OFF signal to the IPD via a second device communication line.

17 Claims, 18 Drawing Sheets

(58) Field of Classification Search
USPC .......................................................... 323/282
See application file for complete search history.

(56) References Cited

U.S. PATENT DOCUMENTS

| | | | | |
|---|---|---|---|---|
| 2019/0165561 | A1* | 5/2019 | Sawano | H02H 3/06 |
| 2024/0305291 | A1* | 9/2024 | Koda | H02J 7/00 |
| 2024/0361817 | A1* | 10/2024 | Naito | H02J 13/00 |

* cited by examiner

Operations of first backup circuit

| Output voltage of first WDT | Output voltage of first micom | State of operating switch | Output voltage to second micom |
|---|---|---|---|
| H | L | — | L |
| L | — | On | H |
| | | Off | L |
| — | H | On | H |
| | | Off | L |

H: High level voltage

L: Low level voltage

POWER SUPPLY CONTROL DEVICE AND POWER SUPPLY CONTROL METHOD

CROSS-REFERENCE TO RELATED APPLICATIONS

This application is the U.S. national stage of PCT/JP2022/015102 filed on Mar. 28, 2022, which claims priority of Japanese Patent Application No. JP 2021-089281 filed on May 27, 2021, the contents of which are incorporated herein.

TECHNICAL FIELD

The present disclosure relates to a power supply control device and a power supply control method.

BACKGROUND

JP 2009-23421A discloses a power supply control device that controls power supply from a power source to a load. A switch is disposed on a power supply path from the power source to the load. A microcomputer (hereinafter, MICOM) transmits a control signal instructing to turn the switch on or off. The switch is turned on or off, in accordance with the control signal transmitted by the MICOM. Power supply is thereby controlled.

In JP 2009-23421A, a MICOM transmits a control signal via a communication line. However, interruption of communication via the communication line is not taken into consideration. If communication is interrupted, the switch cannot be turned on or off.

In view of this, an object is to provide a power supply control device and a power supply control method that are able to turn a switch on or off, even if communication is interrupted.

SUMMARY

A power supply control device according to one mode of the present disclosure is a power supply control device for controlling power supplied via a power supply switch, including a switcher configured to turn the power supply switch on or off, a first communication unit configured to transmit an ON signal instructing to turn on the power supply switch and an OFF signal instructing to turn off the power supply switch to the switcher via a first communication line, a determination unit configured to determine whether communication via the first communication line is interrupted, and a second communication unit configured to transmit the ON signal and the OFF signal to the switcher via a second communication line, if it is determined by the determination unit that the interruption has occurred.

A power supply control method according to one mode of the present disclosure is a power supply control method for controlling power supplied via a power supply switch, including transmitting an ON signal instructing to turn on the power supply switch and an OFF signal instructing to turn off the power supply switch to a switcher configured to turn the power supply switch on or off via a first communication line, determining whether communication via the first communication line is interrupted, and transmitting the ON signal and the OFF signal to the switcher via a second communication line, if it is determined that the interruption has occurred.

Note that the present disclosure can be realized not only as a power supply control device that executes characteristic processing such as the above but also as a power supply control method having characteristic processing such as the above as steps, or as a computer program for causing a computer to execute such steps. Also, the present disclosure can be realized as a semiconductor integrated circuit that realizes part or all of the power supply control device, or as a power system that includes the power supply control device.

Advantageous Effects

According to the present disclosure, a switch can be turned on or off, even if communication is interrupted.

DETAILED DESCRIPTION OF PREFERRED EMBODIMENTS

Figure 1:
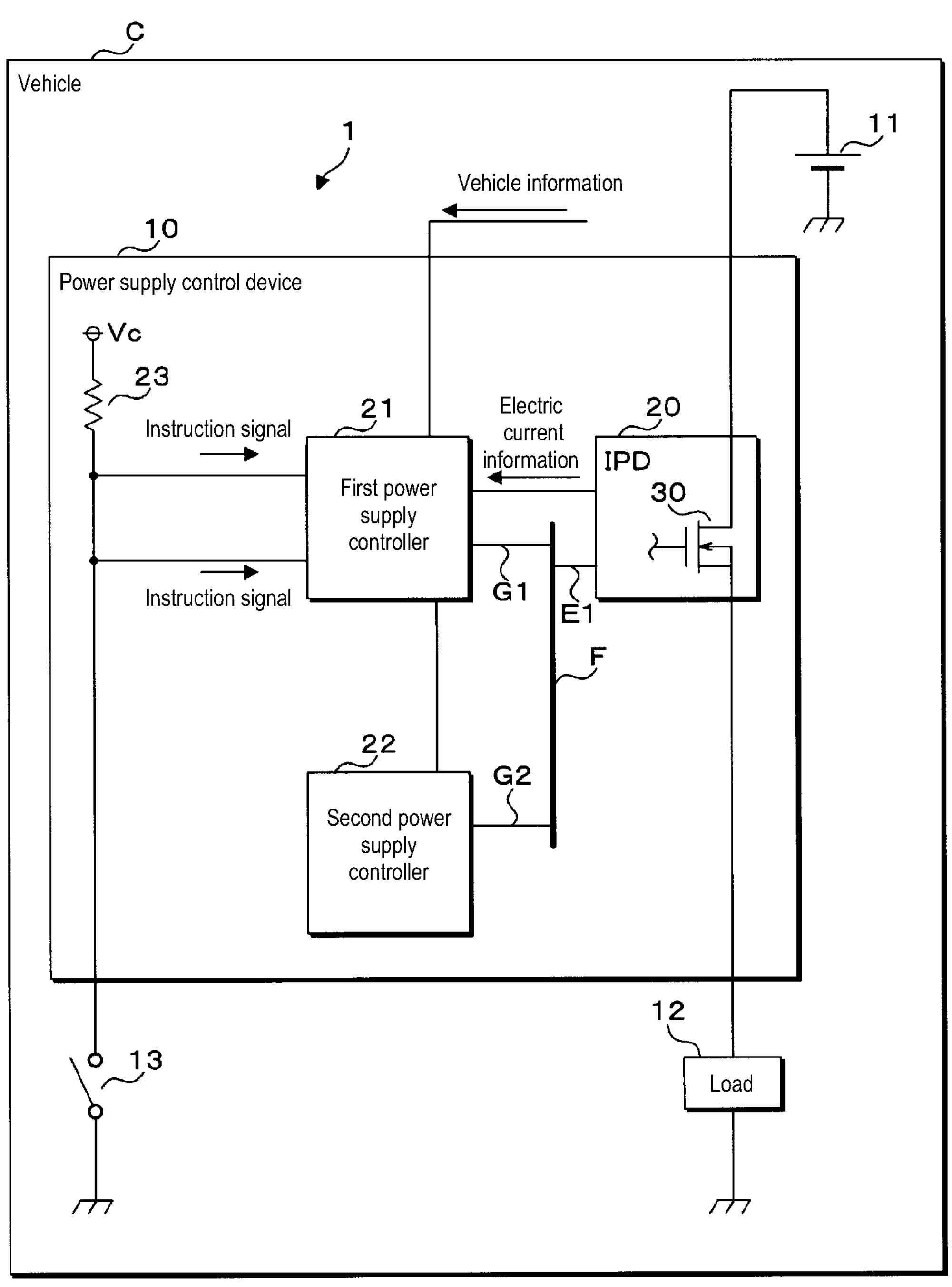
FIG. 1 is a block diagram showing the configuration of a main section of a power system according to Embodiment 1.

Initially, modes of the present disclosure will be enumerated and described. At least some of the embodiments described below may be freely combined.

A power supply control device according to one mode of the present disclosure is a power supply control device for controlling power supplied via a power supply switch, including a switcher configured to turn the power supply switch on or off, a first communication unit configured to transmit an ON signal instructing to turn on the power supply switch and an OFF signal instructing to turn off the power supply switch to the switcher via a first communication line, a determination unit configured to determine whether communication via the first communication line is interrupted, and a second communication unit configured to transmit the ON signal and the OFF signal to the switcher via a second communication line, if it is determined by the determination unit that the interruption has occurred.

The power supply control device according to one mode of the present disclosure may further include a communication bus connected to the switcher, the first communication line and the second communication line, the first communication unit and the second communication unit may each transmit the ON signal or the OFF signal to the switcher via the communication bus, the first communication unit and the second communication unit may be disposed on a first board, and the switcher and the communication bus may be disposed on a second board.

The power supply control device according to one mode of the present disclosure may further include an instruction unit configured to instruct the first communication unit to transmit the ON signal or the OFF signal, and an acquisition unit configured to acquire a value of a switch current flowing through the power supply switch, and the determination unit may determine that the interruption has occurred, if the value of the switch current acquired by the acquisition unit is less than a predetermined current value despite the instruction unit instructing the first communication unit to transmit the ON signal.

The power supply control device according to one mode of the present disclosure may further include an instruction unit configured to instruct the first communication unit to transmit the ON signal or the OFF signal, and an acquisition unit configured to acquire a value of a switch current flowing through the power supply switch, and the determination unit may determine that the interruption has occurred, if the value of the switch current acquired by the acquisition unit is greater than or equal to a second predetermined current value despite the instruction unit instructing the first communication unit to transmit the OFF signal.

The power supply control device according to one mode of the present disclosure may further include an instruction unit configured to instruct the first communication unit to transmit the ON signal or the OFF signal, and the determination unit may determine that the interruption has occurred, if the instruction unit stops operating.

The power supply control device according to one mode of the present disclosure may further include a second power supply switch disposed on a second current path different from a first current path of the current flowing through the power supply switch, a second switcher configured to turn the second power supply switch on or off, and a second determination unit configured to determine whether communication is interrupted, the second communication unit may transmit a second ON signal instructing to turn on the second power supply switch and a second OFF signal instructing to turn off the second power supply switch to the second switcher via the second communication line, the second determination unit may determine whether communication via the second communication line is interrupted, and the first communication unit may transmit the second ON signal and the second OFF signal to the second switcher, if it is determined by the second determination unit that communication via the second communication line is interrupted.

A power supply control method according to one mode of the present disclosure is a power supply control method for controlling power supplied via a power supply switch, including transmitting an ON signal instructing to turn on the power supply switch and an OFF signal instructing to turn off the power supply switch to a switcher configured to turn the power supply switch on or off via a first communication line, determining whether communication via the first communication line is interrupted, and transmitting the ON signal and the OFF signal to the switcher via a second communication line, if it is determined that the interruption has occurred.

In the power supply control device and power supply control method according to the above modes, the switcher turns the power supply switch on or off in accordance with the signal transmitted via the first communication line. If communication via the first communication line is interrupted, the ON signal and the OFF signal are transmitted via the second communication line. The switcher turns the power supply switch on or off in accordance with the signal transmitted via the second communication line. Accordingly, even if communication via the first communication line is interrupted, the switcher is able to turn the power supply switch on or off.

With the power supply control device according to the above modes, the first board is connected to the second board by the first communication line. The first communication line is thus susceptible to disconnection. If the first communication line is disconnected, communication via the first communication line is interrupted. The second communication unit, instead of the first communication unit, transmits the ON signal and the OFF signal to the switcher. The second communication unit plays an important role.

With the power supply control device according to the above modes, interruption of communication is detected, when the switch current is small despite the instruction unit instructing the first communication unit to transmit the ON signal.

With the power supply control device according to the above modes, interruption of communication is detected, when the switch current is large despite the instruction unit instructing the first communication unit to transmit the OFF signal.

With the power supply control device according to the above modes, interruption of communication is detected, when the instruction unit stops operating.

With the power supply control device according to the above modes, the second switcher turns the second power supply switch on or off in accordance with the signal transmitted via the second communication line. When communication via the second communication line is interrupted, the ON signal and the OFF signal are transmitted via the first communication line. The second switcher turns the second power supply switch on or off in accordance with the signal transmitted via the first communication line. Accordingly, even if communication via the second communication line is interrupted, the second switcher is able to turn the second power supply switch on or off.

Specific examples of a power system according to embodiments of the present disclosure will be described below with reference to the drawings. Note that the present disclosure is not limited to these illustrative examples and is indicated by the claims, and all changes that come within the meaning and range of equivalency of the claims are intended to be embraced therein.

Embodiment 1

Configuration of Power System 1

FIG. 1 is a block diagram showing the configuration of a main section of a power system 1 according to Embodiment 1. The power system 1 is installed in a vehicle C. The power system 1 includes a power supply control device 10, a DC (Direct Current) power source 11, a load 12 and an operating switch 13. The DC power source 11 is a battery, for example. The load 12 is an electrical device. When power is supplied to the load 12, the load 12 operates. When power supply to the load 12 stops, the load 12 stops operating.

The power supply control device 10 includes a power supply switch 30. The power supply switch 30 is an N-channel FET (Field Effect Transistor). When the power supply switch 30 is on, the resistance value between the drain and source of the power supply switch 30 is sufficiently small. It is thus possible for a current to flow through the drain and source of the power supply switch 30. When the power supply switch 30 is off, the resistance value between the drain and source of the power supply switch 30 is sufficiently large. Thus, a current does not flow through the drain and source of the power supply switch 30.

The drain and source of the power supply switch 30 of the power supply control device 10 are respectively connected to a positive electrode of the DC power source 11 and one end of the load 12. A negative electrode of the DC power source 11 and the other end of the load 12 are grounded. Grounding is realized by connection to the body of the vehicle C, for example. One end of the operating switch 13 is connected to the power supply control device 10. The other end of the operating switch 13 is grounded.

Vehicle information related to the vehicle C is input to the power supply control device 10. The vehicle information indicates the speed of the vehicle C, the acceleration of the vehicle C, the brightness around the vehicle C or the like. The operating switch 13 is turned on or off by an occupant of the vehicle C. The power supply control device 10 turns the power supply switch 30 on or off, based on the state of the operating switch 13 and the input vehicle information.

When the power supply control device 10 turns on the power supply switch 30, a current flows in order of the power supply switch 30 and the load 12 from the positive electrode of the DC power source 11, and power is supplied to the load 12. As a result, the load 12 operates. When the power supply control device 10 turns off the power supply switch 30, power supply to the load 12 via the power supply switch 30 stops. As a result, the load 12 stops operating. The power supply control device 10 controls power supply from the DC power source 11 to the load 12 via the power supply switch 30, by turning the power supply switch 30 on or off.

Configuration of Power Supply Control Device 10

The power supply control device 10 includes an IPD (Intelligent Power Device) 20, a first power supply controller 21, a second power supply controller 22, a device resistor 23 and a communication bus F. The IPD 20 includes the power supply switch 30. The IPD 20 is connected to the first power supply controller 21. The IPD 20 is, furthermore, connected to the communication bus F by an IPD communication line E1. The first power supply controller 21 is, furthermore, connected to the communication bus F by a first device communication line G1. The first power supply controller 21 is, furthermore, connected to the second power supply controller 22. The second power supply controller 22 is, furthermore, connected to the communication bus F by a second device communication line G2. The communication bus F is connected to the IPD communication line E1, the first device communication line G1 and the second device communication line G2. The first device communication line G1 and the second device communication line G2 respectively function as a first communication line and a second communication line.

A constant voltage Vc is applied to one end of the device resistor 23. The constant voltage Vc is generated by a regulator stepping down the end-to-end voltage of the DC power source 11, for example. The other end of the device resistor 23 is connected to one end of the operating switch 13. As aforementioned, the other end of the operating switch 13 is grounded. The connection node between the device resistor 23 and the operating switch 13 is connected to the first power supply controller 21.

The first power supply controller 21 and the second power supply controller 22 each transmit an ON signal instructing to turn on the power supply switch 30 and an OFF signal instructing to turn off the power supply switch 30 to the IPD 20. The first power supply controller 21 transmits the ON signal and the OFF signal to the IPD 20, via the first device communication line G1, the communication bus F and the IPD communication line E1. The second power supply controller 22 transmits the ON signal and the OFF signal to the IPD 20 via the second device communication line G2, the communication bus F and the IPD communication line E1.

The IPD 20, in the case of receiving the ON signal, turns on the power supply switch 30. The IPD 20, in the case of receiving the OFF signal, turns off the power supply switch 30. The IPD 20 outputs, to the first power supply controller 21, analog electric current information indicating a switch current that flows through the power supply switch 30. The electric current information is a voltage proportional to the switch current.

The occupant of the vehicle C gives an instruction to turn on the power supply switch 30, by turning on the operating switch 13. The occupant of the vehicle C gives an instruction to turn off the power supply switch 30, by turning off the operating switch 13. An instruction signal that instructs to turn the power supply switch 30 on or off is input to the first power supply controller 21 from the connection node between the device resistor 23 and the operating switch 13. The instruction signal shows a high level voltage or a low level voltage. The high level voltage is a voltage greater than or equal to a positive voltage threshold. The low level voltage is a voltage less than the voltage threshold. The constant voltage Vc is a value greater than or equal to the voltage threshold. Zero V is less than the voltage threshold.

When the operating switch 13 is on, a current flows in order of the device resistor 23 and the operating switch 13. At this time, the voltage of the connection node between the device resistor 23 and the operating switch 13 is zero V, and is the low level voltage. Accordingly, when the operating switch 13 is on, the instruction signal shows the low level voltage. The instruction signal instructs to turn on the power supply switch 30, by showing the low level voltage.

When the operating switch 13 is off, a current does not flow through the device resistor 23. At this time, the voltage of the connection node between the device resistor 23 and the operating switch 13 is the constant voltage Vc and is the high level voltage. Accordingly, when the operating switch 13 is off, the instruction signal shows the high level voltage. The instruction signal instructs to turn off the power supply switch 30, by showing the high level voltage.

Vehicle information is input to the first power supply controller 21. The first power supply controller 21 transmits the ON signal or the OFF signal to the IPD 20 via the first device communication line G1, based on the instruction signal and the vehicle information. The first power supply controller 21 normally outputs the low level voltage to the second power supply controller 22. The first power supply controller 21 determines whether communication via the first device communication line G1 is interrupted. One determination method uses the electric current information. The first power supply controller 21, in the case of determining that communication via the first device communication line G1 is interrupted, outputs, to the second power supply controller 22, a voltage that depends on the instruction of the instruction signal. When the instruction signal instructs to turn on the power supply switch 30, the first power supply controller 21 outputs the high level voltage to the second power supply controller 22. When the instruction signal instructs to turn off the power supply switch 30, the first power supply controller 21 outputs the low level voltage to the second power supply controller 22.

When the voltage being input from the first power supply controller 21 switches from the low level voltage to the high level voltage, the second power supply controller 22 transmits the ON signal to the IPD 20 via the second device communication line G2. When the voltage being input from the first power supply controller 21 switches from the high level voltage to the low level voltage, the second power supply controller 22 transmits the OFF signal to the IPD 20 via the second device communication line G2. As described above, when interruption of communication via the first device communication line G1 is detected, the second power supply controller 22, instead of the first power supply controller 21, transmits the ON signal and the OFF signal to the IPD 20.

Outward Appearance of Power Supply Control Device 10

Figure 2:
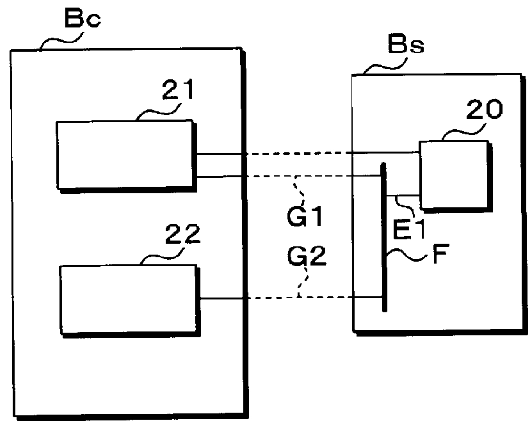
FIG. 2 is a plan view of a power supply control device.

FIG. 2 is a plan view of the power supply control device 10. The power supply control device 10 further includes a control board Bc and a switch board Bs. The first power supply controller 21 and the second power supply controller 22 are disposed on a main surface of the control board Bc. The main surfaces of the boards have a large surface area and differ from the end faces. The IPD 20 is disposed on a main surface of the switch board Bs. The communication bus F is, furthermore, disposed on the main surface of the switch board Bs. As aforementioned, the IPD 20 is connected to the first power supply controller 21. The IPD 20, the first power supply controller 21 and the second power supply controller 22 are respectively connected to the communication bus F by the IPD communication line E1, the first device communication line G1 and the second device communication line G2. The control board Bc and the switch board Bs respectively function as a first board and a second board.

The control board Bc is connected to the switch board Bs by the connection line between the IPD 20 and the first power supply controller 21, the first device communication line G1 and the second device communication line G2. The first device communication line G1 is thus susceptible to disconnection. If the first device communication line G1 is disconnected, communication via the first device communication line G1 is interrupted. As a result, the second power supply controller 22, instead of the first power supply controller 21, transmits the ON signal and the OFF signal to the IPD 20. The second power supply controller 22 plays an important role.

Configuration of IPD 20

Figure 3:
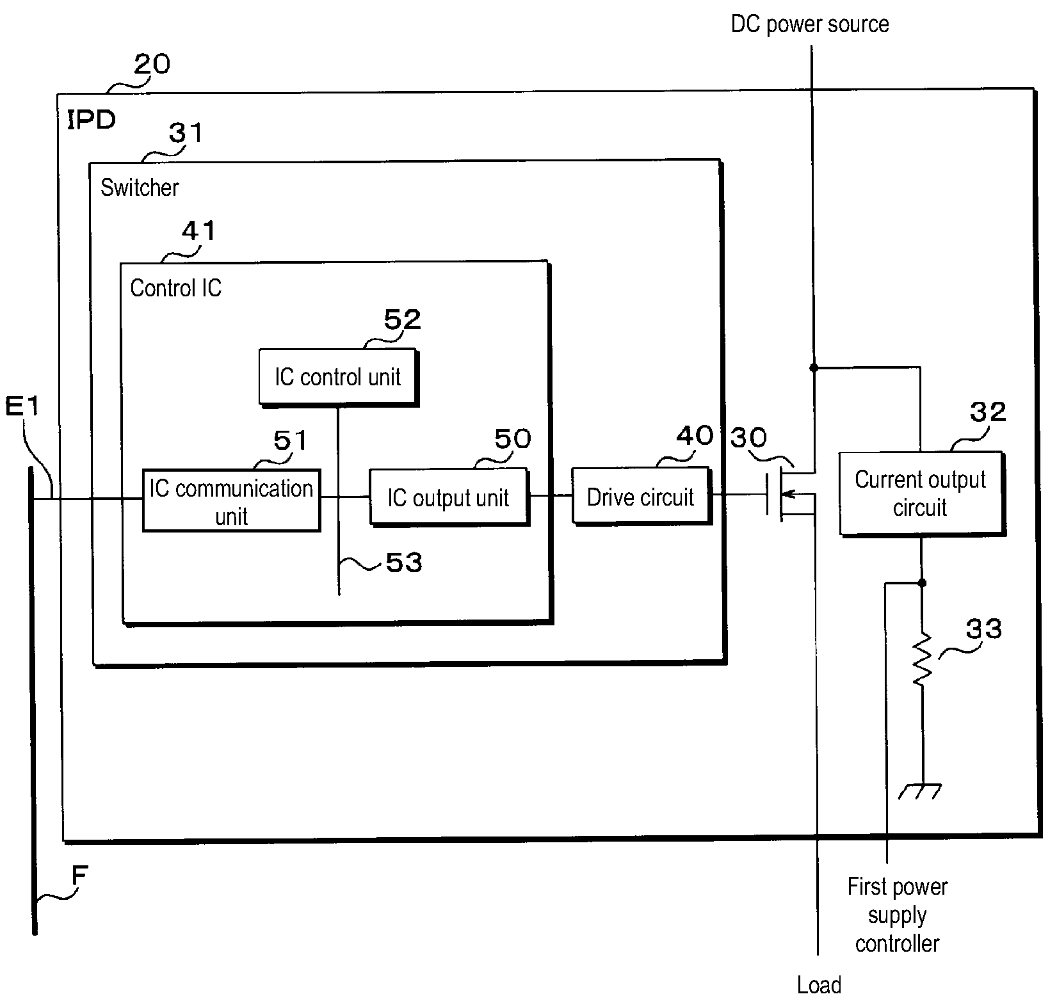
FIG. 3 is a block diagram showing the configuration of a main section of an IPD.

FIG. 3 is a block diagram showing the configuration of a main section of the IPD 20. The IPD 20 includes a switcher 31, a current output circuit 32 and a detection resistor 33, in addition to the power supply switch 30. Accordingly, the switcher 31, the current output circuit 32 and the detection resistor 33 are disposed on the main surface of the switch board Bs. The switcher 31 includes a drive circuit 40 and a control IC 41. IC is short for integrated circuit. The control IC 41 includes an IC output unit 50, an IC communication unit 51 and an IC control unit 52. The gate of the power supply switch 30 is connected to the drive circuit 40 of the switcher 31. The drive circuit 40 is, furthermore, connected to the IC output unit 50 of the control IC 41. The IC output unit 50, the IC communication unit 51 and the IC control unit 52 are connected to an IC bus 53. The IC communication unit 51 is, furthermore, connected to the communication bus F by the IPD communication line E1.

The drain of the power supply switch 30 is, furthermore, connected to the current output circuit 32. The current output circuit 32 is connected to one end of the detection resistor 33. The other end of the detection resistor 33 is grounded. The connection node of the current output circuit 32 and the detection resistor 33 is connected to the first power supply controller 21.

When the voltage of the gate of the power supply switch 30 relative to the potential of the source is greater than or equal to a fixed ON threshold, the power supply switch 30 is on. When the voltage of the gate relative to the potential of the source is less than a fixed OFF threshold, the power supply switch 30 is off. The ON threshold is greater than or equal to the OFF threshold. The IC output unit 50 outputs the high level voltage or the low level voltage to the drive circuit 40.

When the output voltage of the IC output unit 50 switches from the low level voltage to the high level voltage, the drive circuit 40 raises the voltage of the gate of the power supply switch 30 relative to ground potential. In the power supply switch 30, the voltage of the gate relative to the potential of the source thereby increases to a voltage greater than or equal to the ON threshold, and the power supply switch 30 turns on.

When the output voltage of the IC output unit 50 switches from the high level voltage to the low level voltage, the drive circuit 40 lowers the voltage of the gate of the power supply switch 30 relative to ground potential. In the power supply switch 30, the voltage of the gate relative to the potential of the source thereby decreases to a voltage less than the OFF threshold, and the power supply switch 30 turns off. As described above, the drive circuit 40 turns the power supply switch 30 on or off, according to the output voltage of the IC output unit 50. The IC output unit 50 switches the voltage being output to the drive circuit 40 to the low level voltage or the high level voltage, in accordance with the instruction from the IC control unit 52. The IC communication unit 51 receives the ON signal and the OFF signal from the first power supply controller 21 and the second power supply controller 22. The IC control unit 52 includes a processing element, such as a CPU (Central Processing Unit), for example. The processing element of the IC control unit 52 executes switch processing for turning the power supply switch 30 on or off, by executing a computer program. The computer program is stored in a storage unit not shown provided in the control IC 41. Note that the IC control unit 52 may include two or more processing elements. In this case, a plurality of processing elements may jointly execute the switch processing.

Figure 4:
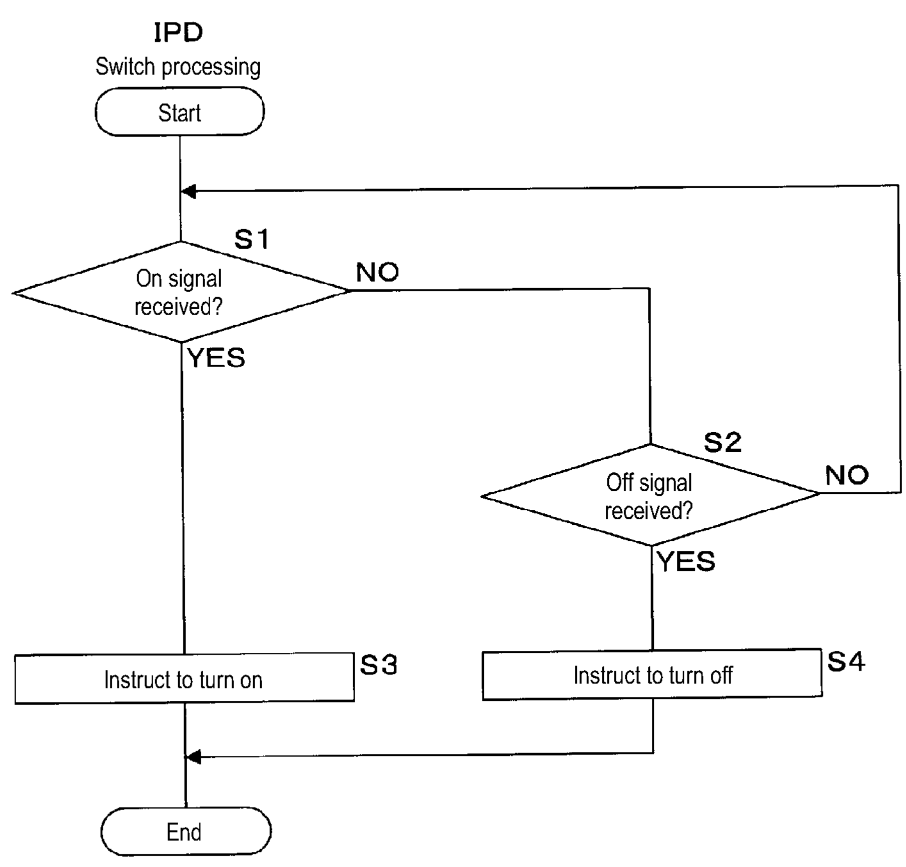
FIG. 4 is a flowchart showing the procedure of switch processing.

FIG. 4 is a flowchart showing the procedure of switch processing. In the switch processing, the IC control unit 52 determines whether the IC communication unit 51 has received the ON signal (step S1). The IC control unit 52, in the case of determining that the IC communication unit 51 has not received the ON signal (S1: NO), determines whether the IC communication unit 51 has received the OFF signal (step S2). The IC control unit 52, in the case of determining that the IC communication unit 51 has not received the OFF signal (S2: NO), executes step S1 and waits until the IC communication unit 51 receives the ON signal or the OFF signal.

The IC control unit 52, in the case of determining that the IC communication unit 51 has received the ON signal (S1: YES), gives an instruction to the IC output unit 50 to turn on the power supply switch 30 (step S3). When turning on the power supply switch 30 is instructed, the IC output unit 50 switches the output voltage being output to the drive circuit 40 from the low level voltage to the high level voltage. The drive circuit 40 thereby turns on the power supply switch 30.

The IC control unit 52, in the case of determining that the IC communication unit 51 has received the OFF signal (S2: YES), gives an instruction to the IC output unit 50 to turn off the power supply switch 30 (step S4). When turning off the power supply switch 30 is instructed, the IC output unit 50 switches the output voltage being output to the drive circuit 40 from the high level voltage to the low level voltage. The drive circuit 40 thereby turns off the power supply switch 30. After executing one of steps S3 and S4, the IC control unit 52 ends the switch processing. After ending the switch processing, the IC control unit 52 executes the switch processing again.

As described above, in the IPD 20, when the IC communication unit 51 receives the ON signal, the drive circuit 40 turns on the power supply switch 30. When the IC communication unit 51 receives the OFF signal, the drive circuit 40 turns off the power supply switch 30. Electric current information is output to the first power supply controller 21 from the connection node between the current output circuit 32 and the detection resistor 33.

The current output circuit 32 shown in FIG. 3 draws a current from the drain of the power supply switch 30, and outputs the drawn current to the detection resistor 33. The output current that the current output circuit 32 outputs is represented by (switch current)/(predetermined number). The predetermined number is 1000, for example. The end-to-end voltage of the detection resistor 33 is output to the first power supply controller 21 as electric current information. The electric current information is represented by (switch current)·(resistance value of detection resistor 33)/(predetermined number). Since the resistance value of the detection resistor 33 and the predetermined number are fixed values, the electric current information indicates the switch current that flows through the power supply switch 30.

Configurations of First Power Supply Controller 21 and Second Power Supply Controller 22

Figure 5:
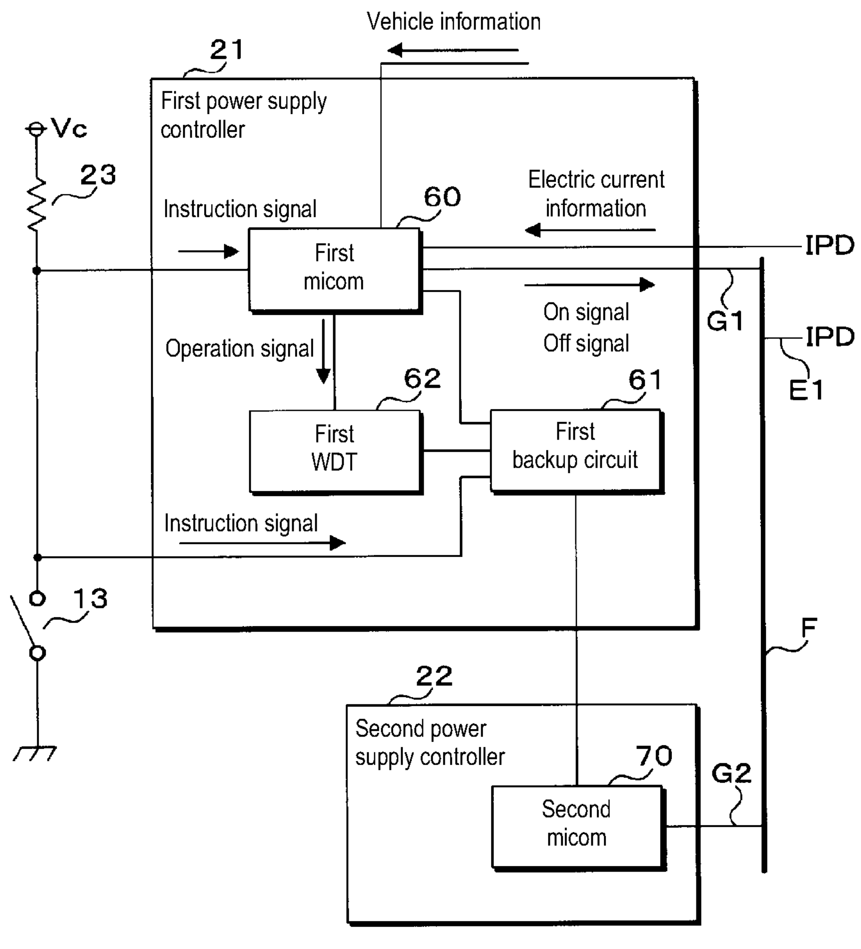
FIG. 5 is a block diagram showing the configurations of main sections of a first power supply control device and a second power supply controller.

FIG. 5 is a block diagram showing the configurations of main sections of the first power supply controller 21 and the second power supply controller 22. The first power supply controller 21 includes a first microcomputer 60, a first backup circuit 61 and a first watchdog timer 62. Hereinafter, microcomputers will be referred to as MICOMs. Watchdog timers will be referred to as WDTs. The second power supply controller 22 includes a second MICOM 70.

The first MICOM 60 is separately connected to the connection node between the current output circuit 32 and detection resistor 33 of the IPD 20 and the connection node between the device resistor 23 and the operating switch 13. The first MICOM 60 is, furthermore, connected to the communication bus F by the first device communication line G1. The first MICOM 60 is, furthermore, separately connected to the first backup circuit 61 and the first WDT 62. The first backup circuit 61 is, furthermore, connected to the connection node between the device resistor 23 and the operating switch 13, the first WDT 62, and the second MICOM 70 of the second power supply controller 22. The second MICOM 70 is, furthermore, connected to the communication bus F by the second device communication line G2.

The instruction signal is input to the first MICOM 60 from the connection node between the device resistor 23 and the operating switch 13. Vehicle information is, furthermore, input to the first MICOM 60. The first MICOM 60 transmits the ON signal or the OFF signal to the IC communication unit 51 of the IPD 20 via the first device communication line G1, based on the input instruction signal and vehicle information. Electric current information is, furthermore, input to the first MICOM 60 from the connection node between the current output circuit 32 and detection resistor 33 of the IPD 20. The first MICOM 60 determines whether communication via the first device communication line G1 is interrupted, based on the input electric current information.

The first MICOM 60 normally outputs the low level voltage to the first backup circuit 61. The first MICOM 60, in the case of detecting that communication via the first device communication line G1 is interrupted, switches the voltage being output to the first backup circuit 61 from the low level voltage to the high level voltage.

During operation, the first MICOM 60 periodically outputs an operation signal indicating that the first MICOM 60 is operating to the first WDT 62. Periodical output of the operation signal stops when the first MICOM 60 stops operating. The first WDT 62 measures a non-input time period for which the operation signal has not been input. When the first MICOM 60 inputs the operation signal to the first WDT 62, the first WDT 62 resets the non-input time period to zero. The first WDT 62 determines whether the first MICOM 60 has stopped operating, based on the measured non-input time period. When the first MICOM 60 has stopped operating, communication via the first device communication line G1 is interrupted. Accordingly, the first WDT 62 determines whether communication via the first device communication line G1 is interrupted, by determining whether the first MICOM 60 has stopped operating. The first WDT 62 functions as a determination unit.

Hereinafter, a fixed time period longer than the transmission period of the operation signal will be referred to as a time period threshold. When the non-input time period is less than the time period threshold, the first WDT 62 determines that the first MICOM 60 is operating. At this time, the first WDT 62 determines that communication via the first device communication line G1 is not interrupted. When the non-input time period becomes greater than or equal to the time period threshold, the first WDT 62 determines that the first MICOM 60 has stopped operating. At this time, the first WDT 62 determines that communication via the first device communication line G1 is interrupted. Because the non-input time period becomes greater than or equal to the time period threshold when the first MICOM 60 stops operating, the first WDT 62 detects that communication via the first device communication line G1 is interrupted.

The first WDT 62 normally outputs the high level voltage to the first backup circuit 61. The first WDT 62, in the case of determining that communication via the first device communication line G1 is interrupted, switches the voltage being output to the first backup circuit 61 from the high level voltage to the low level voltage.

When the first MICOM 60 and the first WDT 62 are respectively outputting the low level voltage and the high level voltage, the first backup circuit 61 outputs the low level voltage to the second MICOM 70 of the second power supply controller 22 regardless of the voltage shown by the instruction signal. In response to the first MICOM 60 switching the output voltage from the low level voltage to the high level voltage, or the first WDT 62 switching the output voltage from the high level voltage to the low level voltage, the first backup circuit 61 outputs, to the second MICOM 70, a voltage that depends on the instruction shown by the instruction signal.

When the instruction signal instructs to turn on the power supply switch 30, the first backup circuit 61 outputs the high level voltage to the second MICOM 70. When the instruction signal instructs to turn off the power supply switch 30, the first backup circuit 61 outputs the low level voltage to the second MICOM 70.

When the input voltage input from the first backup circuit 61 switches from the low level voltage to the high level voltage, the second MICOM 70 transmits the ON signal to the IC communication unit 51 of the IPD 20 via the second device communication line G2. When the input voltage input from the first backup circuit 61 switches from the high level voltage to the low level voltage, the second MICOM 70 transmits the OFF signal to the IC communication unit 51 of the IPD 20 via the second device communication line G2.

As described above, when the first MICOM 60 or the first WDT 62 detects that communication via the first device communication line G1 is interrupted, the first backup circuit 61 outputs, to the second MICOM 70, a voltage that depends on the instruction of the instruction signal. The second MICOM 70, instead of the first MICOM 60, transmits the ON signal and the OFF signal to the IC communication unit 51 of the IPD 20, according to the output voltage of the first backup circuit 61.

Configuration of First MICOM 60

Figure 6:
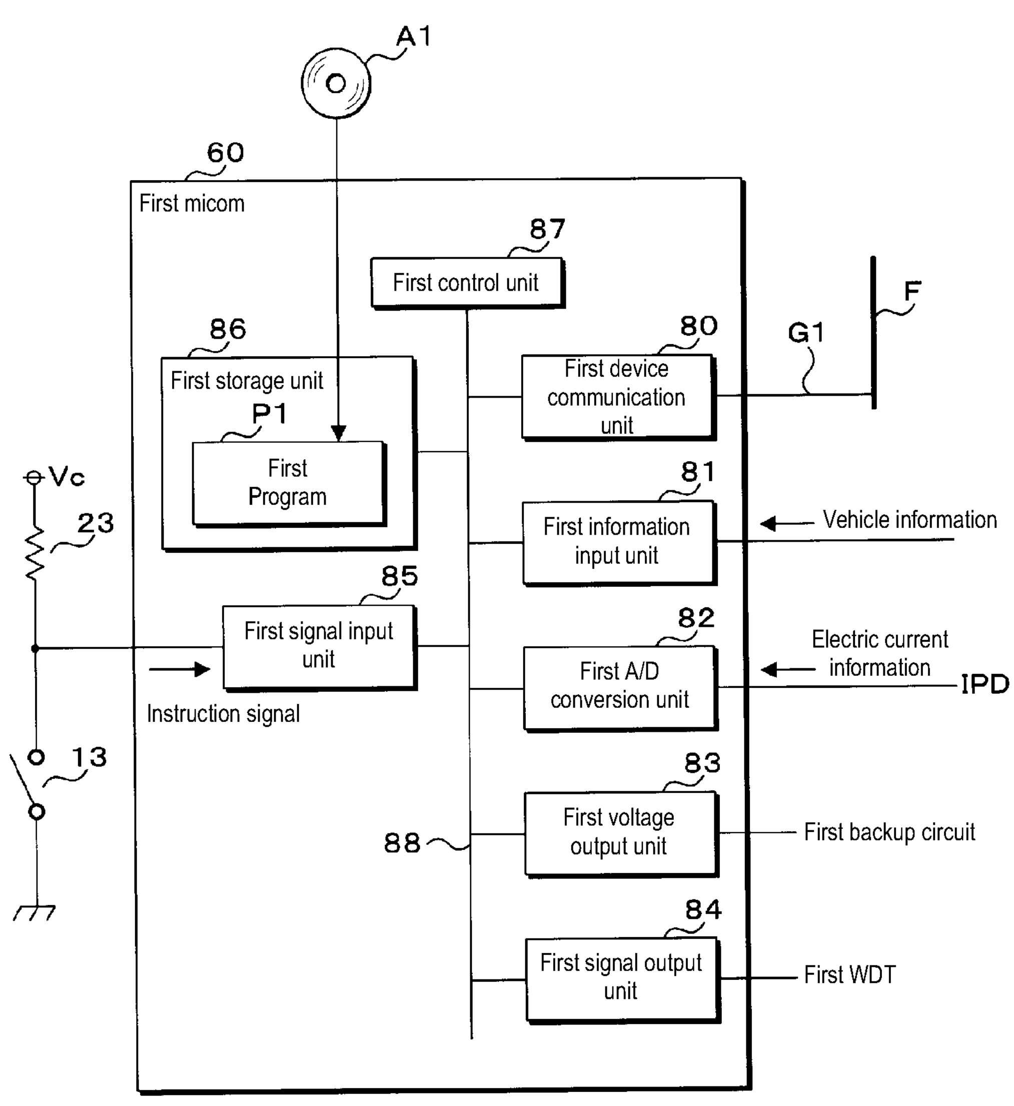
FIG. 6 is a block diagram showing the configuration of a main section of a first MICOM.

FIG. 6 is a block diagram showing the configuration of a main section of the first MICOM 60. The first MICOM 60 includes a first device communication unit 80, a first information input unit 81, a first A/D conversion unit 82, a first voltage output unit 83, a first signal output unit 84, a first signal input unit 85, a first storage unit 86 and a first control unit 87. Accordingly, the first device communication unit 80, the first information input unit 81, the first A/D conversion unit 82, the first voltage output unit 83, the first signal output unit 84, the first signal input unit 85, the first storage unit 86 and the first control unit 87 are disposed on the main surface of the control board Bc.

The first device communication unit 80, the first information input unit 81, the first A/D conversion unit 82, the first voltage output unit 83, the first signal output unit 84, the first signal input unit 85, the first storage unit 86 and the first control unit 87 are connected to a first device bus 88. The first device communication unit 80 is, furthermore, connected to the communication bus F by the first device communication line G1. The first A/D conversion unit 82 is connected to the connection node between the current output circuit 32 and detection resistor 33 of the IPD 20. The first voltage output unit 83 is connected to the first backup circuit 61. The first signal output unit 84 is connected to the first WDT 62. The first signal input unit 85 is connected to the connection node between the device resistor 23 and the operating switch 13.

The first device communication unit 80 transmits the ON signal and the OFF signal to the IC communication unit 51 of the IPD 20 via the first device communication line G1, the communication bus F and the IPD communication line E1, in accordance with the instruction from the first control unit 87. The first device communication unit 80 functions as a first communication unit. Vehicle information is input to the first information input unit 81. Analog electric current information is input to the first A/D conversion unit 82 from the connection node between the current output circuit 32 and detection resistor 33 of the IPD 20. The first A/D conversion unit 82 converts the input analog electric current information into digital electric current information. The first control unit 87 acquires the digital electric current information obtained through conversion by the first A/D conversion unit 82.

As aforementioned, the electric current information indicates the switch current that flows through the power supply switch 30. Acquiring the electric current information is equivalent to acquiring the value of the switch current. The first control unit 87 functions as an acquisition unit.

The first voltage output unit 83 outputs the high level voltage or the low level voltage to the first backup circuit 61. The first voltage output unit 83 switches the output voltage to the high level voltage or the low level voltage, in accordance with the instruction from the first control unit 87. The first signal output unit 84 outputs the operation signal to the first WDT 62 in accordance with the instruction from the first control unit 87. The instruction signal is input to the first signal input unit 85 from the connection node between the device resistor 23 and the operating switch 13.

The first storage unit 86 is constituted by a volatile memory and a non-volatile memory, for example. The first storage unit 86 stores a first program P1. The first program P1 is a computer program. The first control unit 87 includes a processing element that executes processing, such as a CPU, for example. The processing element of the first control unit 87 executes output processing, signal transmission processing, interruption detection processing and the like by executing the first program P1. The output processing is processing for outputting the operation signal to the first WDT 62. The signal transmission processing is processing for transmitting the ON signal or the OFF signal. The interruption detection processing is processing for detecting interruption of communication via the first device communication line G1.

Note that the first program P1 may be provided to the first MICOM 60, using a non-transitory first storage medium A1 that stores the first program P1 in a readable manner. The first storage medium A1 is a portable memory, for example. In the case where the first storage medium A1 is a portable memory, the processing element of the first control unit 87 may read the first program P1 from the first storage medium A1 using a reading device not shown. The read first program P1 is written to the first storage unit 86. Furthermore, the first program P1 may be provided to the first MICOM 60, by a communication unit not shown of the first MICOM 60 communicating with an external device. In this case, the processing element of the first control unit 87 acquires the first program P1 through the communication unit. The acquired first program P1 is written to the first storage unit 86. The first control unit 87 may include two or more processing elements. In this case, a plurality of processing elements may jointly execute the output processing, signal transmission processing, interruption detection processing and the like.

When the first control unit 87 stops operating, the first MICOM 60 stops operating. Accordingly, operation of the first MICOM 60 stopping is equivalent to operation of the first control unit 87 stopping.

In the output processing, the first control unit 87 instructs the first signal output unit 84 to output the operation signal to the first WDT 62, every time one period elapses.

Figure 7:
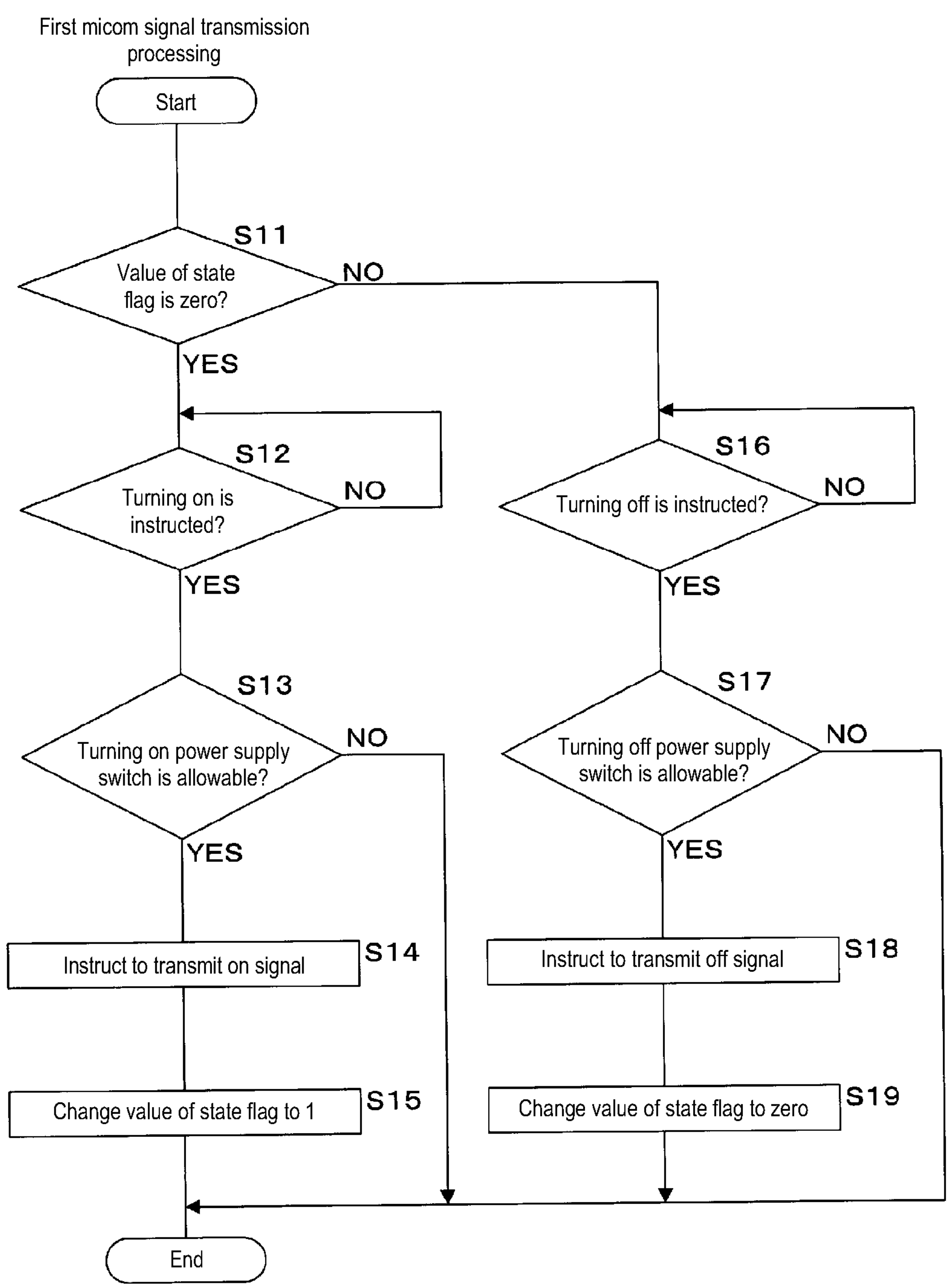
FIG. 7 is a flowchart showing the procedure of signal transmission processing.

FIG. 7 is a flowchart showing the procedure of signal transmission processing. The first storage unit 86 stores the value of a state flag. The first control unit 87 changes the value of the state flag to zero or 1. As will be described later, the first control unit 87, in the case of having instructed the first device communication unit 80 to transmit the ON signal, changes the value of the state flag to 1. The first control unit 87, in the case of having instructed the first device communication unit 80 to transmit the OFF signal, changes the value of the state flag to zero.

In the signal transmission processing, the first control unit 87, first, determines whether the value of the state flag is zero (step S11). If the value of the state flag is not zero, the value of the state flag is 1. The first control unit 87, in the case of determining that the value of the state flag is zero (S11: YES), determines whether turning on the power supply switch 30 is being instructed by the instruction signal (step S12). When the instruction signal shows the low level voltage, the instruction signal is instructing to turn on the power supply switch 30. The first control unit 87, in the case of determining that turning on the power supply switch 30 is not being instructed (S12: NO), executes step S12 again. The first control unit 87 waits until the voltage shown by the instruction signal switches from the high level voltage to the low level voltage.

The first control unit 87, in the case of determining that turning on the power supply switch 30 is being instructed by the instruction signal (S12: YES), determines whether turning on the power supply switch 30 is allowable, based on the vehicle information being input to the first information input unit 81 (step S13). Assume that the load 12 is a motor that unlocks doors of the vehicle C, and the vehicle information indicates the speed of the vehicle C. In this case, when the speed indicated by the vehicle information is zero, for example, the first control unit 87 determines that turning on the power supply switch 30 is allowable. In the same case, when the speed indicated by the vehicle information exceeds zero, for example, the first control unit 87 determines that turning on the power supply switch 30 is not allowable.

The first control unit 87, in the case of determining that turning on the power supply switch 30 is allowable (S13: YES), instructs the first device communication unit 80 to transmit the ON signal (step S14). The first device communication unit 80 thereby transmits the ON signal to the IC communication unit 51 of the IPD 20 via the first device communication line G1, and the drive circuit 40 of the IPD 20 turns on the power supply switch 30. The first control unit 87 also functions as an instruction unit. After executing step S14, the first control unit 87 changes the value of the state flag to 1 (step S15). The first control unit 87, in the case of determining that turning on the power supply switch 30 is not allowable (S13: NO), or after executing step S15, ends the signal transmission processing. After ending the signal transmission processing, the first control unit 87 executes the signal transmission processing again.

The first control unit 87, in the case of determining that the value of the state flag is not zero (S11: NO), determines whether turning off the power supply switch 30 is being instructed by the instruction signal (step S16). When the instruction signal shows the high level voltage, the instruction signal is instructing to turn off the power supply switch 30. The first control unit 87, in the case of determining that turning off the power supply switch 30 is not being instructed (S16: NO), executes step S16 again. The first control unit 87 waits until the voltage shown by the instruction signal switches from the low level voltage to the high level voltage.

The first control unit 87, in the case of determining that turning off the power supply switch 30 is being instructed by the instruction signal (S16: YES), determines whether turning off the power supply switch 30 is allowable, based on the vehicle information being input to the first information input unit 81 (step S17). Assume that the load 12 is headlights of the vehicle C, and the vehicle information indicates the speed of the vehicle C and the brightness around the vehicle C. In this case, when the brightness indicated by the vehicle information is high, for example, the first control unit 87 determines that turning off the power supply switch 30 is allowable regardless of the speed of the vehicle C. In the same case, when the speed of the vehicle C exceeds zero and the brightness indicated by the vehicle information is low, for example, the first control unit 87 determines that turning off the power supply switch 30 is not allowable.

The first control unit 87, in the case of determining that turning off the power supply switch 30 is allowable (S17: YES), instructs the first device communication unit 80 to transmit the OFF signal (step S18). The first device communication unit 80 thereby transmits the OFF signal to the IC communication unit 51 of the IPD 20 via the first device communication line G1, and the drive circuit 40 of the IPD 20 turns off the power supply switch 30. After executing step S18, the first control unit 87 changes the value of the state flag to zero (step S19). The first control unit 87, in the case of determining that turning off the power supply switch 30 is not allowable (S17: NO), or after executing executes step S19, ends the signal transmission processing. After ending the signal transmission processing, the first control unit 87 executes the signal transmission processing again.

As described above, when the instruction signal instructs to turn on the power supply switch 30, the first device communication unit 80 transmits the ON signal to the IC communication unit 51 of the IPD 20. The drive circuit 40 thereby turns on the power supply switch 30. When the instruction signal instructs to turn off the power supply switch 30, the first device communication unit 80 transmits the OFF signal to the IC communication unit 51 of the IPD 20. The drive circuit 40 thereby turns off the power supply switch 30.

Figure 8:
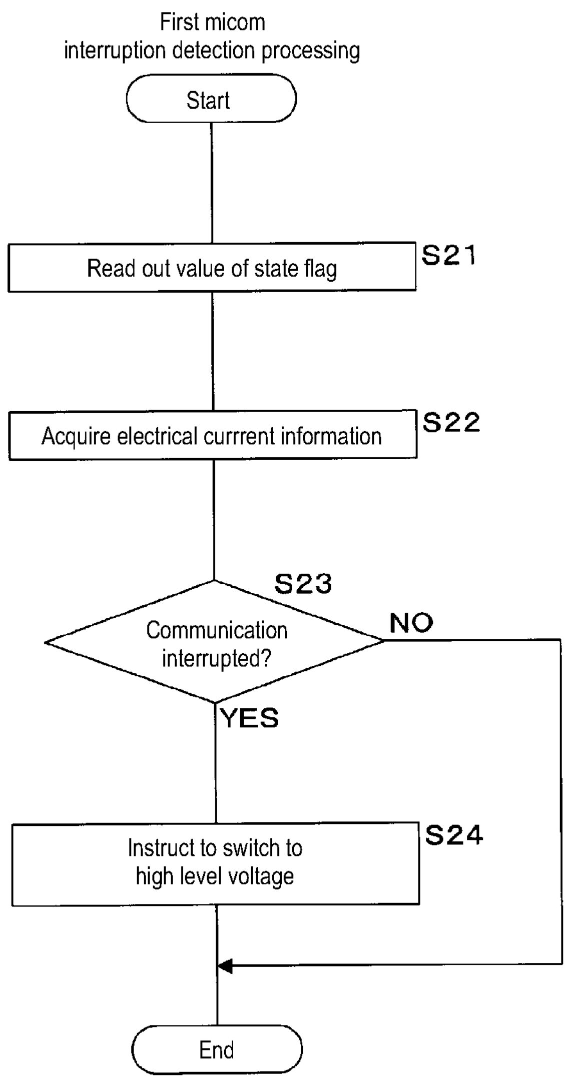
FIG. 8 is a flowchart showing the procedure of interruption detection processing.

FIG. 8 is a flowchart showing the procedure of interruption detection processing. In the interruption detection processing, the first control unit 87, first, reads out the value of the state flag (step S21) and acquires electric current information from the first A/D conversion unit 82 (step S22). As aforementioned, acquiring the electric current information is equivalent to acquiring the value of the switch current. Next, the first control unit 87 determines whether communication via the first device communication line G1 is interrupted, based on the value of the state flag read out in step S21 and the switch current indicated by the electric current information acquired in step S22 (step S23). The first control unit 87 also functions as a determination unit. As aforementioned, the first WDT 62 also functions as a determination unit.

The determination of step S23 in the case where the value of the state flag read out in step S21 is zero will now be described. As aforementioned, in the signal transmission processing, the first control unit 87, in the case of having instructed the first device communication unit 80 to transmit the OFF signal, changes the value of the state flag to zero. In the case where communication via the first device communication line G1 is not interrupted, the power supply switch 30 is off when the value of the state flag is zero. When the power supply switch 30 is off, the switch current that flows through the power supply switch 30 is zero A.

In step S23, the first control unit 87 determines that communication is not interrupted, if the switch current indicated by the electric current information acquired in step S22 is less than a fixed first current threshold. The first current threshold is a positive value near zero A. The first control unit 87 determines that communication is interrupted, if the switch current indicated by the electric current information acquired in step S22 is greater than or equal to the first current threshold despite the value of the state flag being zero. Interruption of communication is detected. The IC communication unit 51 of the IPD 20 is regarded as having not received the OFF signal. The first current threshold corresponds to the second predetermined current.

The determination of step S23 in the case where the value of the state flag read out in step S21 is 1 will now be described. As aforementioned, in the signal transmission processing, the first control unit 87, in the case of having instructed the first device communication unit 80 to transmit the ON signal, changes the value of the state flag to 1. In the case where communication via the first device communication line G1 is not interrupted, the power supply switch 30 is on when the value of the state flag is 1. When the power supply switch 30 is on, the switch current that flows through the power supply switch 30 is relatively large.

In step S23, the first control unit 87 determines that communication is not interrupted, if the switch current indicated by the electric current information acquired in step S22 is greater than or equal to a fixed second current threshold. The second current threshold is a positive value near zero A. The second current threshold may be the same as or different from the first current threshold. The first control unit 87 determines that communication is interrupted, if the switch current indicated by the electric current information acquired in step S22 is less than the second current threshold despite the value of the state flag being 1. Interruption of communication is detected. The IC communication unit 51 of the IPD 20 is regarded as having not received the ON signal.

The first control unit 87, in the case of determining that communication is not interrupted (S23: NO), ends the interruption detection processing. In this case, the first control unit 87 executes the interruption detection processing again. The first control unit 87, in the case of determining that communication is interrupted (S23: YES), instructs the first voltage output unit 83 to switch the voltage being output to the first backup circuit 61 by the first voltage output unit 83 from the low level voltage to the high level voltage (step S24).

After executing step S24, the first control unit 87 ends the interruption detection processing. In this case, the first control unit 87 does not execute the interruption detection processing again. Furthermore, the first control unit 87 stops executing the signal transmission processing.

As described above, the first control unit 87 detects that communication via the first device communication line G1 is interrupted, based on the value of the state flag and the switch current. The first control unit 87, in the case of determining that communication via the first device communication line G1 is interrupted, instructs the first voltage output unit 83 to switch the output voltage being output to the first backup circuit 61 from the low level voltage to the high level voltage. The first backup circuit 61 thereby outputs, to the second MICOM 70 of the second power supply controller 22, a voltage that depends on the instruction of the instruction signal. The second MICOM 70, instead of the first device communication unit 80 of the first MICOM 60, transmits the ON signal and the OFF signal to the IC communication unit 51 of the IPD 20.

Configuration of First Backup Circuit 61

Figures 9, 10:
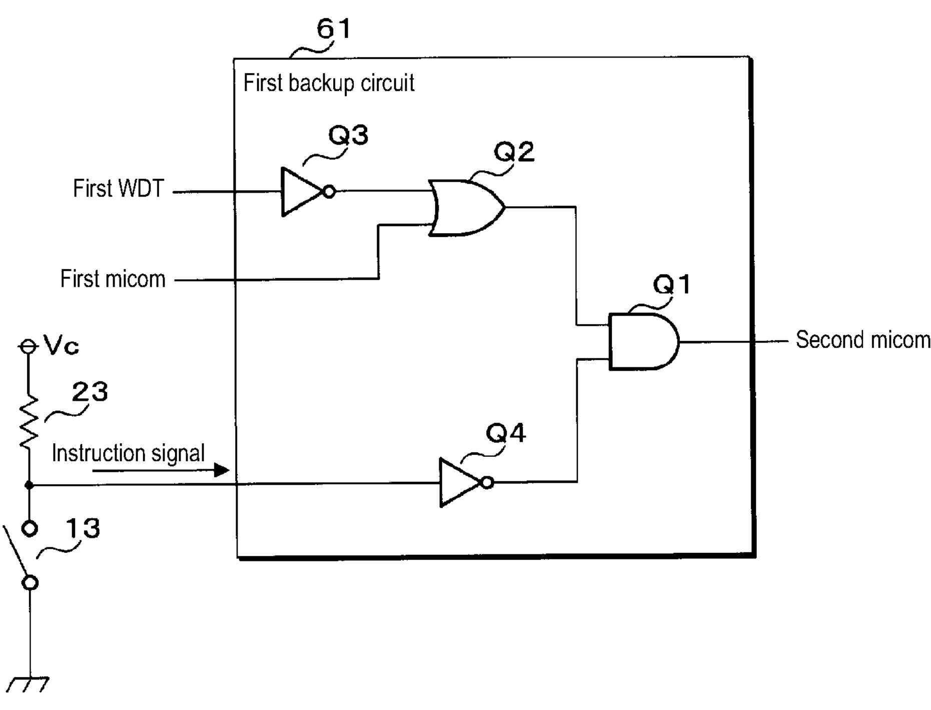
FIG. 9 is a circuit diagram of a first backup circuit.
FIG. 10 is a chart showing operations of the first backup circuit.

FIG. 9 is a circuit diagram of the first backup circuit 61. The first backup circuit 61 includes an AND circuit Q1, an OR circuit Q2, a first inverter Q3 and a second inverter Q4. The AND circuit Q1 and the OR circuit Q2 each have two input ends and one output end. The first inverter Q3 and the second inverter Q4 each have one input end and one output end.

The output end of the AND circuit Q1 is connected to the second MICOM 70 of the second power supply controller 22. One input end of the AND circuit Q1 is connected to the output end of the OR circuit Q2. One input end of the OR circuit Q2 is connected to the output end of the first inverter Q3. The input end of the first inverter Q3 is connected to the first WDT 62. The other input end of the OR circuit Q2 is connected to the first voltage output unit 83 of the first MICOM 60. The other input end of the AND circuit Q1 is connected to the output end of the second inverter Q4. The input end of the second inverter Q4 is connected to the connection node between the device resistor 23 and the operating switch 13.

The first inverter Q3 outputs the low level voltage to the OR circuit Q2, when the output voltage of the first WDT 62 is the high level voltage. The first inverter Q3 outputs the high level voltage to the OR circuit Q2, when the output voltage of the first WDT 62 is the low level voltage. The OR circuit Q2 outputs the low level voltage to the AND circuit Q1, when both the first inverter Q3 and the first voltage output unit 83 are outputting the low level voltage. The OR circuit Q2 outputs the high level voltage to the AND circuit Q1, when at least one of the first inverter Q3 and the first voltage output unit 83 is outputting the high level voltage.

The second inverter Q4 outputs the high level voltage to the AND circuit Q1, when the voltage of the instruction signal is the low level voltage. The second inverter Q4 outputs the low level voltage, when the voltage of the instruction signal is the high level voltage. The AND circuit Q1 outputs the high level voltage to the second MICOM 70, when both the OR circuit Q2 and the second inverter Q4 are outputting the high level voltage. The AND circuit Q1 outputs the low level voltage to the second MICOM 70, when at least one of the OR circuit Q2 and the second inverter Q4 is outputting the low level voltage.

FIG. 10 is a chart showing operations of the first backup circuit 61. When the first WDT 62 and the first voltage output unit 83 of the first MICOM 60 are respectively outputting the high level voltage and the low level voltage, the OR circuit Q2 outputs the low level voltage to the AND circuit Q1. Thus, regardless of the state of the operating switch 13, that is, the voltage of the instruction signal, the AND circuit Q1 outputs the low level voltage to the second MICOM 70.

When the first WDT 62 is outputting the low level voltage, the OR circuit Q2 outputs the high level voltage to the AND circuit Q1 regardless of the output voltage of the first voltage output unit 83 of the first MICOM 60. In this case, the AND circuit Q1 outputs the same voltage as the output voltage of the second inverter Q4 to the second MICOM 70. Accordingly, when the operating switch 13 is on, the AND circuit Q1 outputs the high level voltage. When the operating switch 13 is off, the AND circuit Q1 outputs the low level voltage. As aforementioned, when the operating switch 13 is on, the instruction signal shows the low level voltage. When the operating switch 13 is off, the instruction signal shows the high level voltage.

When the first voltage output unit 83 of the first MICOM 60 is outputting the high level voltage, the OR circuit Q2 outputs the high level voltage to the AND circuit Q1 regardless of the output voltage of the first WDT 62. In this case, the AND circuit Q1 outputs the same voltage as the output voltage of the second inverter Q4 to the second MICOM 70. Accordingly, when the operating switch 13 is on, the AND circuit Q1 outputs the high level voltage. When the operating switch 13 is off, the AND circuit Q1 outputs the low level voltage.

As described above, in the case of the first voltage output unit 83 of the first MICOM 60 outputting the high level voltage or the first WDT 62 outputting the low level voltage, the first backup circuit 61 outputs, to the second MICOM 70, a voltage that depends on the instruction of the instruction signal.

Configuration of Second MICOM 70

Figure 11:
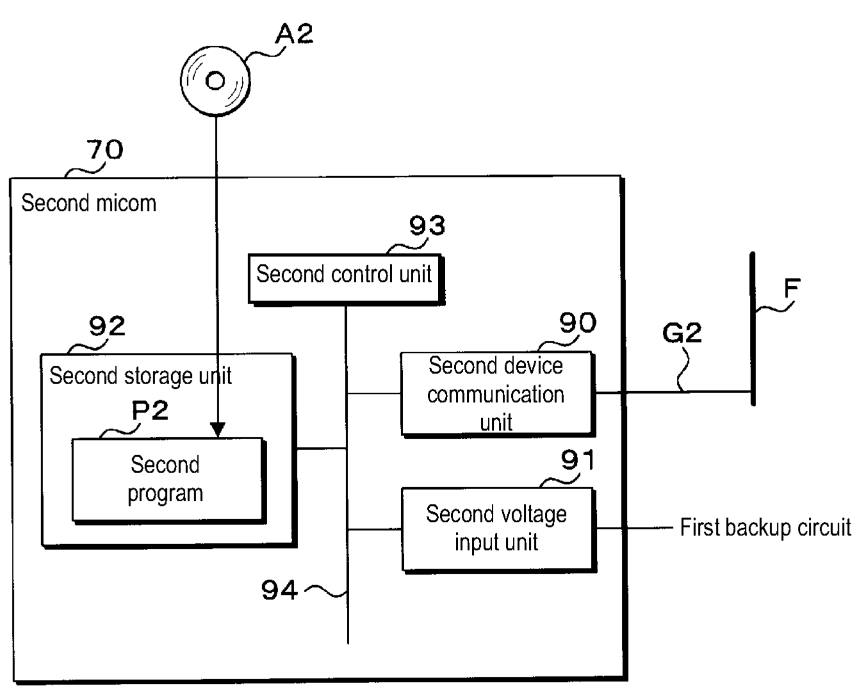
FIG. 11 is a block diagram showing the configuration of a main section of a second MICOM.

FIG. 11 is a block diagram showing the configuration of a main section of the second MICOM 70. The second MICOM 70 includes a second device communication unit 90, a second voltage input unit 91, a second storage unit 92 and a second control unit 93. Accordingly, the second device communication unit 90, the second voltage input unit 91, the second storage unit 92 and the second control unit 93 are disposed on the main surface of the control board Bc. The second device communication unit 90, the second voltage input unit 91, the second storage unit 92 and the second control unit 93 are connected to a second device bus 94. The second device communication unit 90 is, furthermore, connected to the communication bus F by the second device communication line G2. The second voltage input unit 91 is, furthermore, connected to the output end of the AND circuit Q1 of the first backup circuit 61.

The second device communication unit 90 transmits the ON signal and the OFF signal to the IC communication unit 51 of the IPD 20 via the second device communication line G2, the communication bus F and the IPD communication line E1, in accordance with the instruction from the second control unit 93. The output voltage of the first backup circuit 61 is input to the second voltage input unit 91. The output voltage of the first backup circuit 61 is the output voltage of the AND circuit Q1. The output voltage of the first backup circuit 61 is the high level voltage or the low level voltage.

The second storage unit 92 is configured by a volatile memory and a non-volatile memory, for example. The second storage unit 92 stores a second program P2. The second program P2 is a computer program. The second control unit 93 includes a processing element that executes processing, such as a CPU, for example. The processing element of the second control unit 93 executes substitute transmission processing by executing the second program P2. The substitute transmission processing is processing in which the second device communication unit 90, instead of the first device communication unit 80 of the first MICOM 60, transmits the ON signal and the OFF signal to the IC communication unit 51 of the IPD 20.

Note that the second program P2 may be provided to the second MICOM 70, using a non-transitory second storage medium A2 on which the second program P2 is stored in a readable manner. The second storage medium A2 is a portable memory, for example. In the case where the second storage medium A2 is a portable memory, the processing element of the second control unit 93 may read the second program P2 from the second storage medium A2 using a reading device not shown. The read second program P2 is written to the second storage unit 92. Furthermore, the second program P2 may be provided to the second MICOM 70, by a communication unit not shown of the second MICOM 70 communicating with an external device. In this case, the processing element of the second control unit 93 acquires the second program P2 through the communication unit. The acquired second program P2 is written to the second storage unit 92. The second control unit 93 may include two or more processing elements. In this case, a plurality of processing elements may jointly execute the substitute transmission processing and the like.

Figure 12:
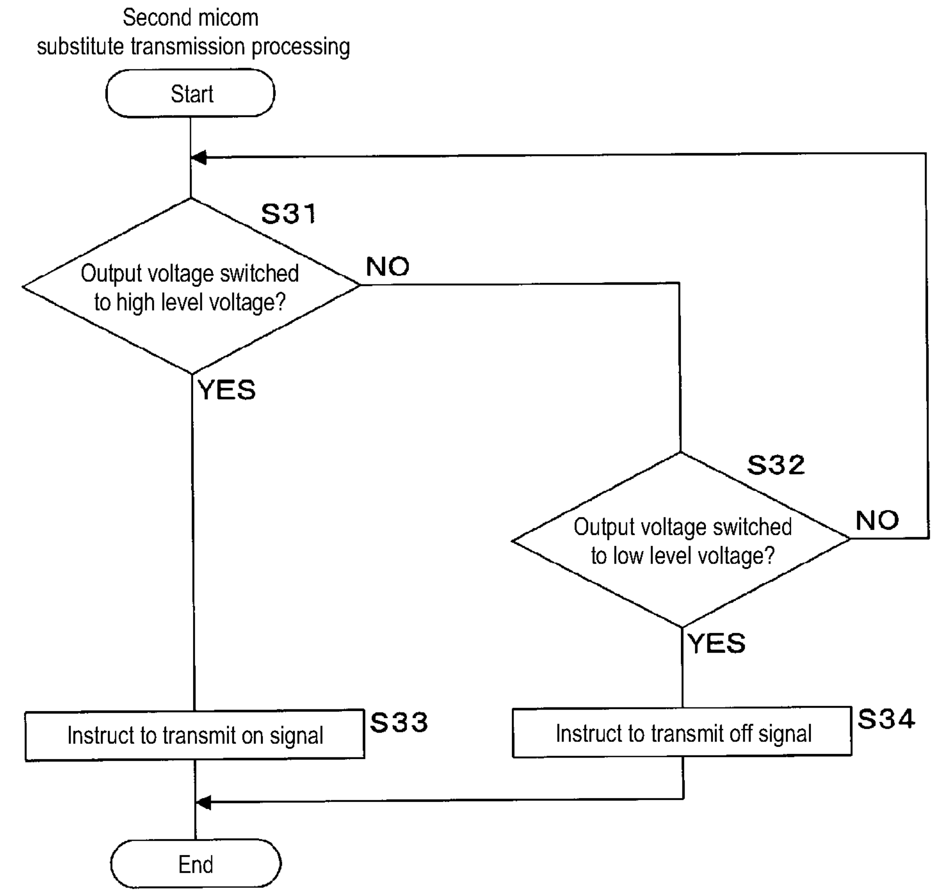
FIG. 12 is a flowchart showing the procedure of substitute transmission processing.

FIG. 12 is a flowchart showing the procedure of substitute transmission processing. In the substitute transmission processing, the second control unit 93, first, determines whether the output voltage of the first backup circuit 61 being input to the second voltage input unit 91 has switched from the low level voltage to the high level voltage (step S31). As aforementioned, the output voltage of the first backup circuit 61 is the output voltage of the AND circuit Q1. The second control unit 93, in the case of determining that the output voltage of the first backup circuit 61 has not switched to the high level voltage (S31: NO), determines whether the output voltage of the first backup circuit 61 being input to the second voltage input unit 91 has switched from the high level voltage to the low level voltage (step S32).

The second control unit 93, in the case of determining that the output voltage of the first backup circuit 61 has not switched to the low level voltage (S32: NO), executes step S31 again and waits until the output voltage of the first backup circuit 61 switches from the high level voltage to the low level voltage. The second control unit 93, in the case of determining that the output voltage of the first backup circuit 61 has switched to the high level voltage (S31: YES), instructs the second device communication unit 90 to transmit the ON signal (step S33). The second device communication unit 90 thereby transmits the ON signal to the IC communication unit 51 of the IPD 20 via the second device communication line G2. The drive circuit 40 of the IPD 20 turns on the power supply switch 30.

The second control unit 93, in the case of determining that the output voltage of the first backup circuit 61 has switched to the low level voltage (S32: YES), instructs the second device communication unit 90 to transmit the OFF signal (step S34). The second device communication unit 90 thereby transmits the OFF signal to the IC communication unit 51 of the IPD 20 via the second device communication line G2. The drive circuit 40 of the IPD 20 turns off the power supply switch 30. After executing one of steps S33 and S34, the second control unit 93 ends the substitute transmission processing. After ending the substitute transmission processing, the second control unit 93 executes the substitute transmission processing again.

Until interruption of communication via the first device communication line G1 is detected, the output voltage of the first backup circuit 61 is fixed to the low level voltage. Thus, until interruption of communication is detected, the second device communication unit 90 of the second MICOM 70 does not transmit the ON signal or the OFF signal. After interruption of communication is detected, the first backup circuit 61 outputs, to the second voltage input unit 91 of the second MICOM 70, a voltage that depends on the instruction shown by the instruction signal. The second device communication unit 90, instead of the first device communication unit 80 of the first MICOM 60, transmits the ON signal or the OFF signal to the IC communication unit 51 of the IPD 20, according to the output voltage of the first backup circuit 61.

Operations Performed by Power Supply Control Device 10

Figure 13:
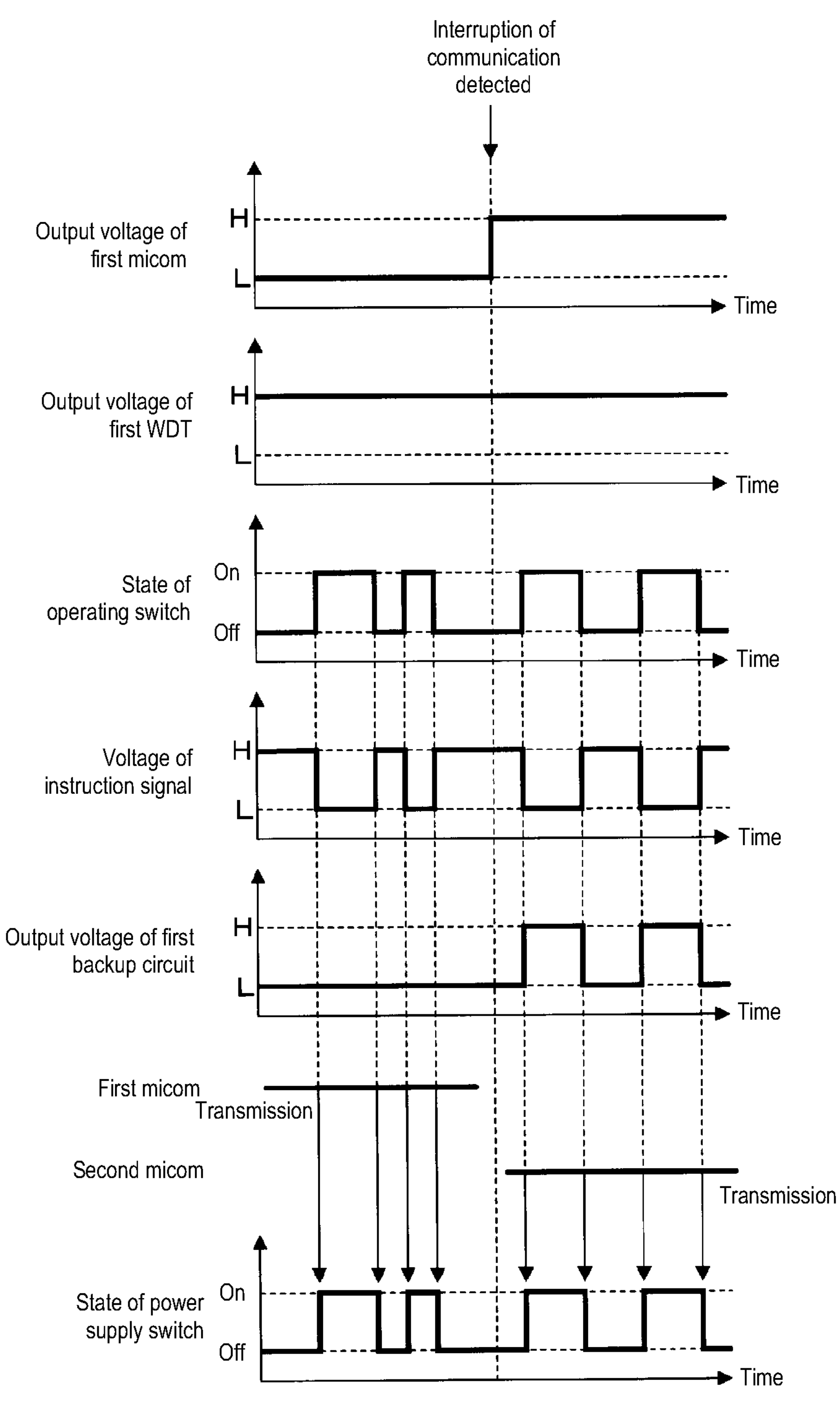
FIG. 13 is a timing chart showing a first example of operations performed by the power supply control device.

FIG. 13 is a timing chart showing a first example of operations performed by the power supply control device 10. FIG. 13 shows transitions of the output voltage of the first MICOM 60, the output voltage of the first WDT 62, the state of the operating switch 13, the voltage of the instruction signal, the output voltage of the first backup circuit 61, and the state of the power supply switch 30. The horizontal axes of these transitions show time. The output voltage of the first MICOM 60 is the output voltage of the first voltage output unit 83. As aforementioned, the output voltage of the first backup circuit 61 is the output voltage of the AND circuit Q1.

FIG. 13, furthermore, shows the timing at which the first device communication unit 80 of the first MICOM 60 and the second device communication unit 90 of the second MICOM 70 each transmit the ON signal or the OFF signal. To simplify description, it is assumed that turning the power supply switch 30 on or off is not prohibited, based on the vehicle information. H indicates the high level voltage. L indicates the low level voltage.

As aforementioned, when the operating switch 13 is on, the instruction signal shows the low level voltage and instructs to turn on the power supply switch 30. When the operating switch 13 is off, the instruction signal shows the high level voltage and instructs to turn off the power supply switch 30.

As aforementioned, when interruption of communication via the first device communication line G1 is not detected, the first voltage output unit 83 of the first MICOM 60 and the first WDT 62 respectively output the low level voltage and the high level voltage. In this case, the output voltage of the first backup circuit 61 is fixed to the low level voltage, and the second device communication unit 90 of the second MICOM 70 does not transmit the ON signal or the OFF signal.

When the voltage of the instruction signal switches from the high level voltage to the low level voltage, the first device communication unit 80 of the first MICOM 60 transmits the ON signal to the IC communication unit 51 of the IPD 20 via the first device communication line G1. The drive circuit 40 of the IPD 20 turns on the power supply switch 30. When the voltage of the instruction signal switches from the low level voltage to the high level voltage, the first device communication unit 80 of the first MICOM 60 transmits the OFF signal to the IC communication unit 51 of the IPD 20 via the first device communication line G1. The drive circuit 40 of the IPD 20 turns off the power supply switch 30.

If the first control unit 87 of the first MICOM 60 determines that communication via the first device communication line G1 is interrupted, the first voltage output unit 83 of the first MICOM 60 switches the output voltage from the low level voltage to the high level voltage. When the output voltage of the first MICOM 60 is the high level voltage, the first backup circuit 61 switches the output voltage to the high level voltage or the low level voltage according to the voltage of the instruction signal (instruction of instruction signal).

When the output voltage of the first backup circuit 61 switches from the low level voltage to the high level voltage, the second device communication unit 90 of the second MICOM 70 transmits the ON signal to the IC communication unit 51 of the IPD 20 via the second device communication line G2. The drive circuit 40 of the IPD 20 turns on the power supply switch 30. When the output voltage of the first backup circuit 61 switches from the high level voltage to the low level voltage, the second device communication unit 90 of the second MICOM 70 transmits the OFF signal to the IC communication unit 51 of the IPD 20 via the second device communication line G2. The drive circuit 40 of the IPD 20 turns off the power supply switch 30. The second device communication unit 90 functions as a second communication unit.

Figure 14:
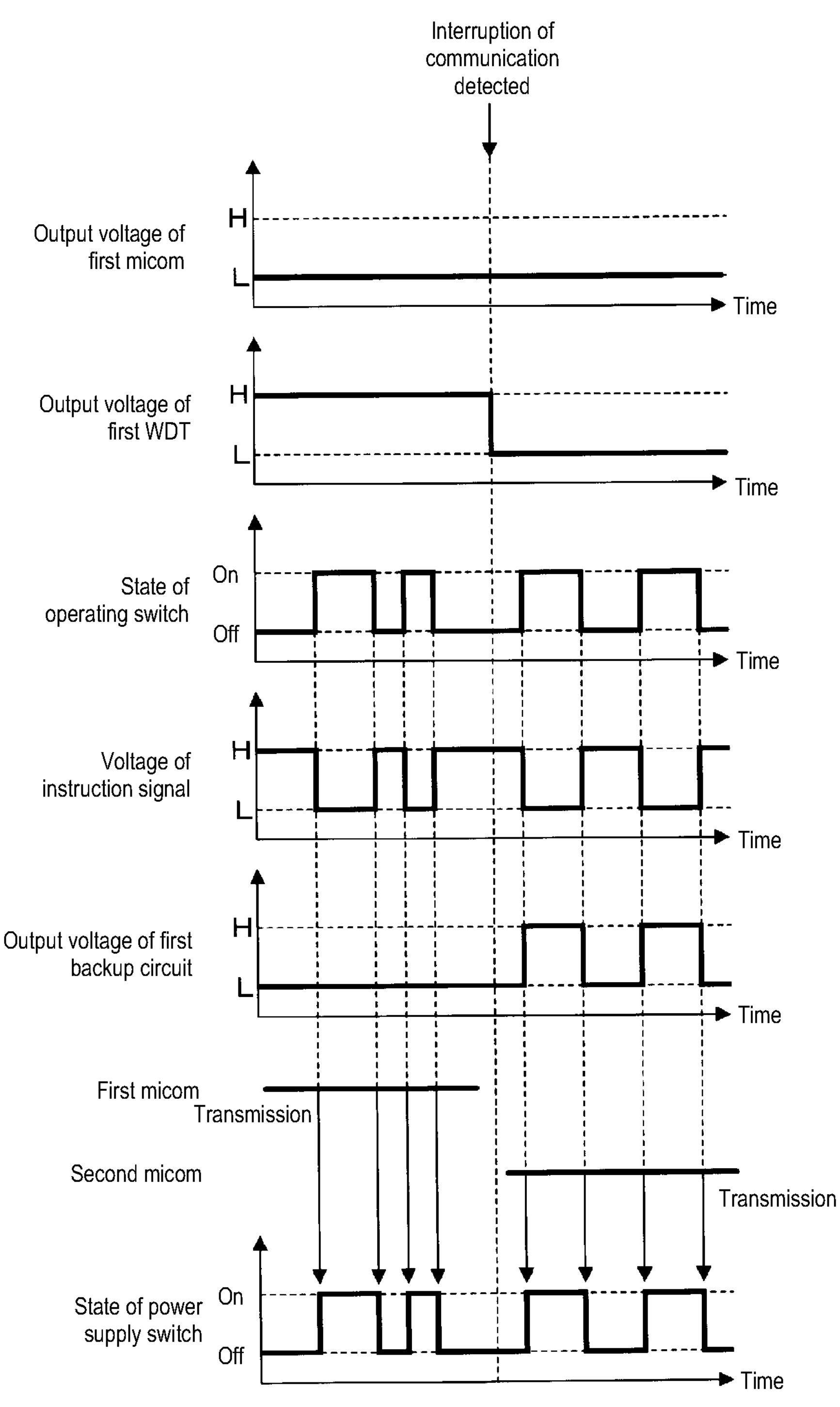
FIG. 14 is a timing chart showing a second example of operations performed by the power supply control device.

FIG. 14 is a timing chart showing a second example of operations performed by the power supply control device 10. FIG. 14, similarly to FIG. 13, shows transitions of the output voltage of the first MICOM 60, the output voltage of the first WDT 62, the state of the operating switch 13, the voltage of the instruction signal, the output voltage of the first backup circuit 61, and the state of the power supply switch 30. The horizontal axes of these transitions show time. FIG. 14, furthermore, shows the timing at which the first device communication unit 80 of the first MICOM 60 and the second device communication unit 90 of the second MICOM 70 each transmit the ON signal or the OFF signal. To simplify description, it is assumed that turning the power supply switch 30 on or off is not prohibited, based on the vehicle information. H indicates the high level voltage. L indicates the low level voltage.

As aforementioned, when interruption of communication via the first device communication line G1 is not detected, the first voltage output unit 83 of the first MICOM 60 and the first WDT 62 respectively output the low level voltage and the high level voltage. In this case, the output voltage of the first backup circuit 61 is fixed to the low level voltage, and the second device communication unit 90 of the second MICOM 70 does not transmit the ON signal or the OFF signal. The first device communication unit 80 of the first MICOM 60 transmits the ON signal or the OFF signal, according to the voltage of the instruction signal (instruction of instruction signal).

If the first WDT 62 detects that communication via the first device communication line G1 is interrupted, the first WDT 62 switches the output voltage being output to the first backup circuit 61 from the high level voltage to the low level voltage. When the output voltage of the first WDT 62 is the low level voltage, the first backup circuit 61 switches the output voltage to the high level voltage or the low level voltage according to the voltage of the instruction signal (instruction of instruction signal).

As aforementioned, the second device communication unit 90 of the second MICOM 70 transmits the ON signal or the OFF signal to the IC communication unit 51 of the IPD 20, according to the output voltage of the first backup circuit 61. In the IPD 20, when the IC communication unit 51 receives the ON signal, the drive circuit 40 turns on the power supply switch 30. When the IC communication unit 51 receives the OFF signal, the drive circuit 40 turns off the power supply switch 30.

As described above, when communication via the first device communication line G1 is interrupted, the second device communication unit 90 of the second MICOM 70, instead of the first device communication unit 80 of the first MICOM 60, transmits the ON signal or the OFF signal to the IC communication unit 51 of the IPD 20 via the second device communication line G2. Thus, even if communication via the first device communication line G1 is interrupted, the drive circuit 40 of the IPD 20 is able to turn the power supply switch 30 on or off.

Embodiment 2

In Embodiment 1, the power supply control device 10 controls power supply to one load. However, the power supply control device 10 may control power supply to each of a plurality of loads.

Hereinafter, the differences of Embodiment 2 from Embodiment 1 will be described. Since the configuration other than that described below is common to Embodiment 1, components common to Embodiment 1 will be given the same reference numerals as Embodiment 1, and description thereof will be omitted.

Configuration of Power System 1

Figure 15:
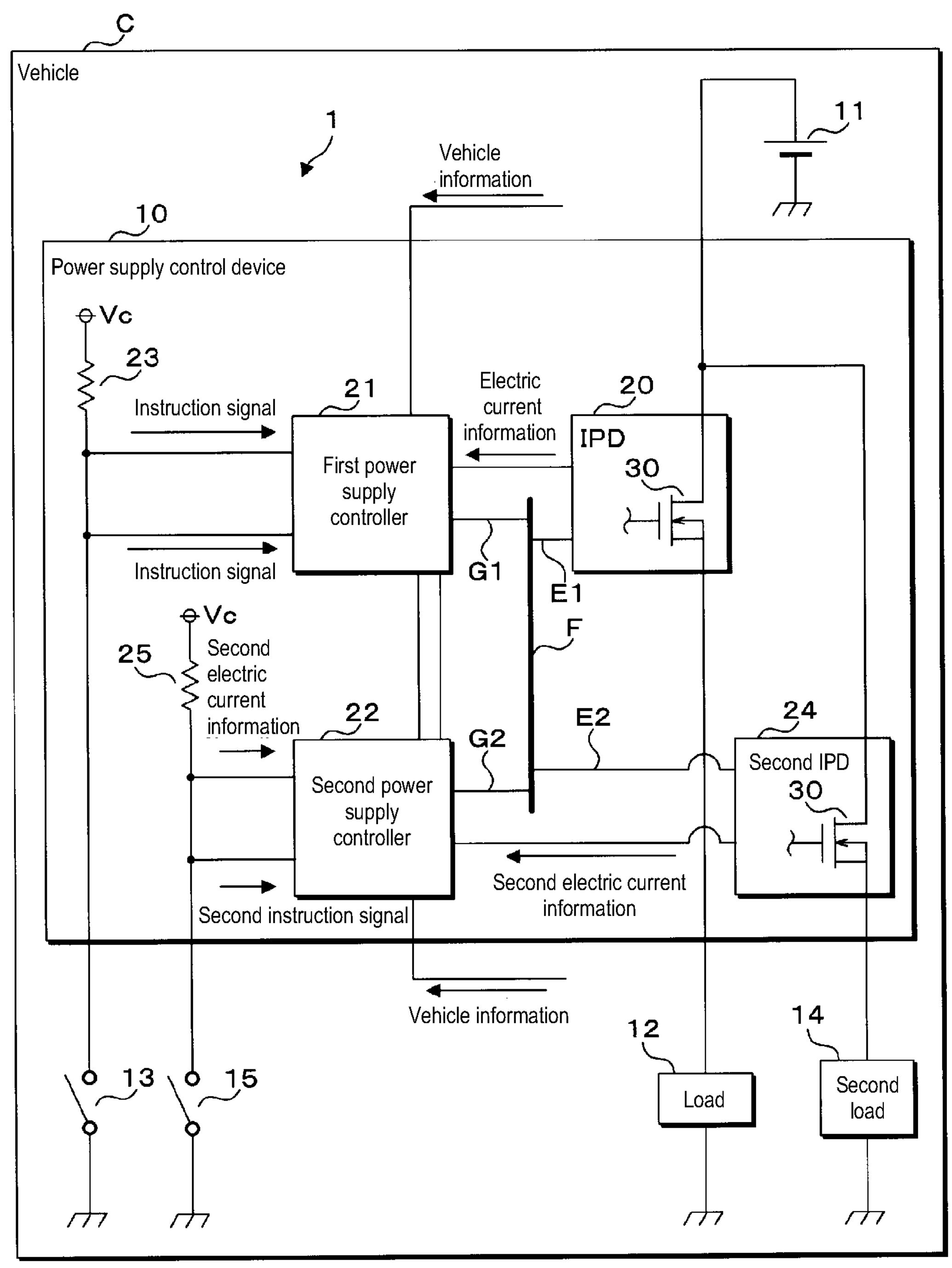
FIG. 15 is a block diagram showing the configuration of a main section of a power system according to Embodiment 2.

FIG. 15 is a block diagram showing the configuration of a main section of a power system 1 of Embodiment 2. The power system 1 of Embodiment 2 similarly includes components that are provided in the power system 1 of Embodiment 1. The power system 1 of Embodiment 2, furthermore, includes a second load 14 and a second operating switch 15. The second load 14 is an electrical device similar to the load 12. When power is supplied to the second load 14, the second load 14 operates. When power supply to the second load 14 stops, the second load 14 stops operating.

A power supply control device 10 of Embodiment 2 similarly includes components that are provided in the power supply control device 10 of Embodiment 1. The power supply control device 10 of Embodiment 2, furthermore, includes a second IPD 24 and a second device resistor 25. The second IPD 24 is configured similarly to the IPD 20. Accordingly, the second IPD 24 includes a power supply switch 30, a switcher 31, a current output circuit 32 and a detection resistor 33. As mentioned in the description of Embodiment 1, the switcher 31 includes a drive circuit 40 and a control IC 41. The control IC 41 includes an IC output unit 50, an IC communication unit 51 and an IC control unit 52.

The drain and source of the power supply switch 30 provided in the second IPD 24 are respectively connected to the positive electrode of the DC power source 11 and one end of the second load 14. The other end of the second load 14 is grounded.

A constant voltage Vc is applied to one end of the second device resistor 25. The other end of the second device resistor 25 is connected to one end of the second operating switch 15. The other end of the second operating switch 15 is grounded. The second operating switch 15 is turned on or off by an occupant of the vehicle C, similarly to the operating switch 13. The power supply control device 10 turns the power supply switch 30 provided in the second IPD 24 on or off, based on the state of the second operating switch 15 and the input vehicle information.

When the power supply control device 10 turns on the power supply switch 30 of the second IPD 24, a current flows in order of the power supply switch 30 of the second IPD 24 and the second load 14 from a positive electrode of the DC power source 11, and power is supplied to the second load 14. As a result, the second load 14 operates. When the power supply control device 10 turns off the power supply switch 30 of the second IPD 24, power supply to the second load 14 via the power supply switch 30 of the second IPD 24 stops. As a result, the second load 14 stops operating.

As mentioned in the description of Embodiment 1, when the power supply switch 30 of the IPD 20 is on, a current flows in order of the power supply switch 30 of the IPD 20 and the load 12 from the positive electrode of the DC power source 11. A first current path of the current flowing through the power supply switch 30 of the IPD 20 is different from a second current path of the current flowing through the second IPD 24. Accordingly, the power supply switch 30 of the second IPD 24 is disposed on the second current path that is different from the first current path of current flowing through the power supply switch 30 of the IPD 20. The power supply switch 30 of the second IPD 24 functions as a second power supply switch.

As described above, the power supply control device 10, furthermore, controls power supply from the DC power source 11 to the second load 14 via the power supply switch 30 of the second IPD 24, by turning the power supply switch 30 of the second IPD 24 on or off. Note that, similarly to Embodiment 1, the power supply control device 10 controls power supply from the DC power source 11 to the load 12 via the power supply switch 30 of the IPD 20, by turning the power supply switch 30 of the IPD 20 on or off.

Configuration of Power Supply Control Device 10

As aforementioned, the second IPD 24 is configured similarly to the IPD 20. The connection node between the current output circuit 32 and detection resistor 33 of the second IPD 24 is connected to the second MICOM 70 of the second power supply controller 22. The second IPD 24 is, furthermore, connected to a communication bus F by a second IPD communication line E2. The communication bus F is connected to an IPD communication line E1, the second IPD communication line E2, a first device communication line G1 and a second device communication line G2. The connection node between the second device resistor 25 and the second operating switch 15 is connected to the second power supply controller 22.

An occupant of a vehicle C gives an instruction to turn on the power supply switch 30 of the second IPD 24, by turning on the second operating switch 15. The occupant of the vehicle C gives an instruction to turn off the power supply switch 30 of the second IPD 24, by turning off the second operating switch 15. A second instruction signal that instructs to turn the power supply switch 30 provided in the second IPD 24 on or off is input to the second power supply controller 22 from the connection node between the second device resistor 25 and the second operating switch 15. The second instruction signal shows the high level voltage or the low level voltage.

When the second operating switch 15 is on, a current flows in order of the second device resistor 25 and the second operating switch 15. At this time, the voltage of the connection node between the second device resistor 25 and the second operating switch 15 is zero V and is the low level voltage. Accordingly, when the second operating switch 15 is on, the second instruction signal shows the low level voltage. The second instruction signal instructs to turn on the power supply switch 30 of the second IPD 24, by showing the low level voltage.

When the second operating switch 15 is off, a current does not flow through the second device resistor 25. At this time, the voltage of the connection node between the second device resistor 25 and the second operating switch 15 is the constant voltage Vc and is the high level voltage. Accordingly, when the second operating switch 15 is off, the second instruction signal shows the high level voltage. The second instruction signal instructs to turn off the power supply switch 30 of the second IPD 24, by showing the high level voltage.

The first power supply controller 21 and the second power supply controller 22 each transmit, to the IC communication unit 51 of the second IPD 24, a second ON signal that instructs to turn on the power supply switch 30 of the second IPD 24 and a second OFF signal that instructs to turn off the power supply switch 30 of the second IPD 24. The first power supply controller 21 transmits the second ON signal and the second OFF signal to the IC communication unit 51 of the second IPD 24, via the first device communication line G1, the communication bus F and the second IPD communication line E2. The second power supply controller 22 transmits the second ON signal and the second OFF signal to the IC communication unit 51 of the second IPD 24, via the second device communication line G2, the communication bus F and the second IPD communication line E2.

The IC communication unit 51 of the second IPD 24 receives the second ON signal and the second OFF signal. The IC control unit 52 of the control IC 41 provided in the second IPD 24 executes switch processing by executing a computer program, similarly to the IC control unit 52 of the IPD 20. The IPD 20, the ON signal and the OFF signal respectively correspond to the second IPD 24, the second ON signal and the second OFF signal.

Accordingly, in the second IPD 24, when the IC communication unit 51 receives the second ON signal, the drive circuit 40 turns on the power supply switch 30. When the IC communication unit 51 receives the second OFF signal, the drive circuit 40 turns off the power supply switch 30. The switcher 31 of the second IPD 24 functions as a second switcher. Analog second electric current information indicating a second switch current that flows through the power supply switch 30 of the second IPD 24 is output to the second power supply controller 22 from the connection node between the current output circuit 32 and detection resistor 33 of the second IPD 24.

In the second IPD 24, the second electric current information is output to the second power supply controller 22 from the connection node between the current output circuit 32 and the detection resistor 33. The second electric current information is a voltage proportional to the second switch current.

Vehicle information is also input to the second power supply controller 22. The second power supply controller 22 transmits the second ON signal or the second OFF signal to the second IPD 24 via the second device communication line G2, based on the second instruction signal and the vehicle information. The second power supply controller 22 normally outputs the low level voltage to the first power supply controller 21. The second power supply controller 22 determines whether communication via the second device communication line G2 is interrupted. One determination method uses the second electric current information. The second power supply controller 22, in the case of determining that communication via the second device communication line G2 is interrupted, outputs, to the first power supply controller 21, a voltage that depends on the instruction of the second instruction signal. When the second instruction signal instructs to turn on the power supply switch 30 of the second IPD 24, the second power supply controller 22 outputs the high level voltage to the first power supply controller 21. When the second instruction signal instructs to turn off the power supply switch 30 of the second IPD 24, the second power supply controller 22 outputs the low level voltage to the first power supply controller 21.

When the voltage being input from the second power supply controller 22 switches from the low level voltage to the high level voltage, the first power supply controller 21 transmits the second ON signal to the IC communication unit 51 of the second IPD 24 via the first device communication line G1. When the voltage being input from the second power supply controller 22 switches from the high level voltage to the low level voltage, the first power supply controller 21 transmits the second OFF signal to the IC communication unit 51 of the second IPD 24 via the first device communication line G1. As described above, when interruption of communication via the second device communication line G2 is detected, the first power supply controller 21, instead of the second power supply controller 22, transmits the second ON signal and the second OFF signal to the IC communication unit 51 of the second IPD 24.

Note that, similarly to Embodiment 1, when interruption of communication via the first device communication line G1 is detected, the second power supply controller 22, instead of the first power supply controller 21, transmits the ON signal and the OFF signal to the IC communication unit 51 of the IPD 20.

Outward Appearance of Power Supply Control Device 10

Figure 16:
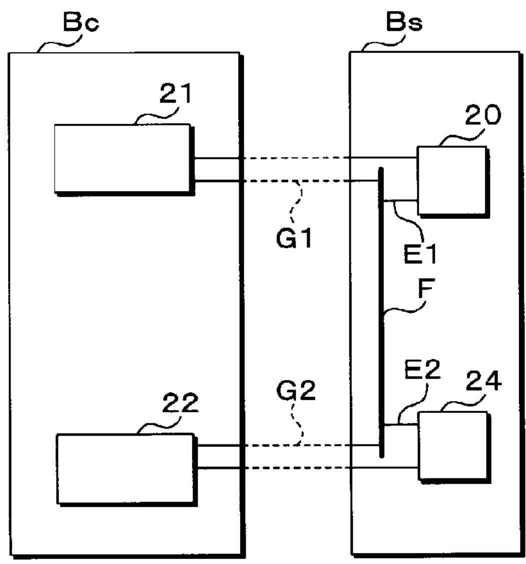
FIG. 16 is a plan view of a power supply control device.

FIG. 16 is a plan view of the power supply control device 10. In Embodiment 2, the second IPD 24 is further disposed on the main surface of the switch board Bs. As aforementioned, the second IPD 24 is connected to the second power supply controller 22. The IPD 20, the first power supply controller 21, the second power supply controller 22 and the second IPD 24 are respectively connected to the communication bus F by the IPD communication line E1, the first device communication line G1, the second device communication line G2 and the second IPD communication line E2.

Accordingly, the control board Bc is connected to the switch board Bs by the connection line between the IPD 20 and the first power supply controller 21, the first device communication line G1, the second device communication line G2, and the connection line between the second IPD 24 and the second power supply controller 22. The second device communication line G2 is thus susceptible to disconnection. If the second device communication line G2 is disconnected, communication via the second device communication line G2 is interrupted. As a result, the first power supply controller 21, instead of the second power supply controller 22, transmits the second ON signal and the second OFF signal to the IC communication unit 51 of the second IPD 24. The first power supply controller 21 plays an important role.

Configurations of First Power Supply Controller 21 and Second Power Supply Controller 22

Figure 17:
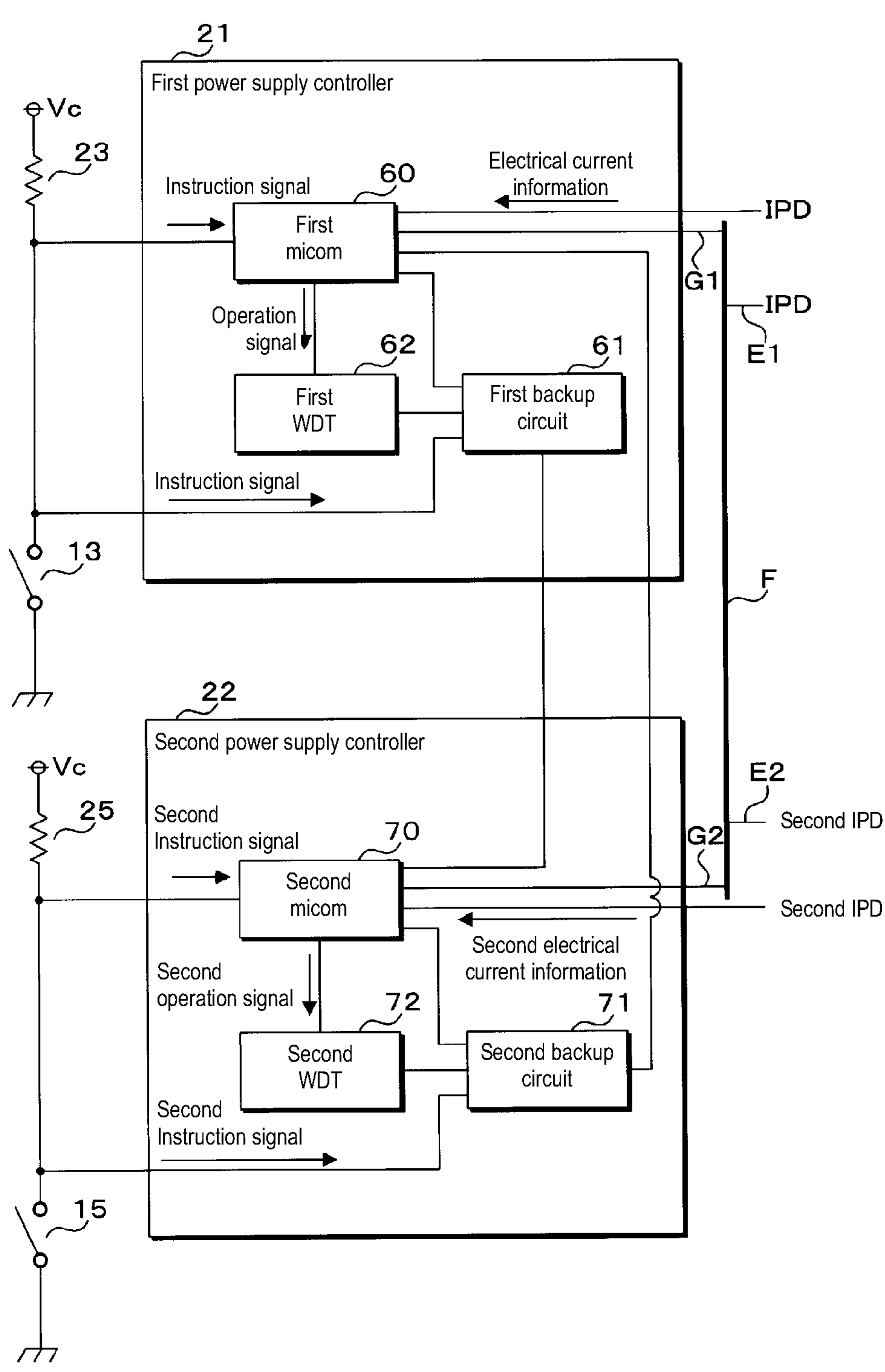
FIG. 17 is a block diagram showing the configurations of main sections of a first power supply control device and a second power supply controller.

FIG. 17 is a block diagram showing the configurations of main sections of the first power supply controller 21 and the second power supply controller 22. In Embodiment 2, the second power supply controller 22 includes a second backup circuit 71 and a second WDT 72, in addition to the second MICOM 70. Similarly to Embodiment 1, the second MICOM 70 is connected to the first backup circuit 61, and is connected to the communication bus F by the second device communication line G2.

In Embodiment 2, the second MICOM 70 is, furthermore, connected to the connection node between the second device resistor 25 and the second operating switch 15, the second backup circuit 71 and the second WDT 72. The connection node between the second device resistor 25 and the second operating switch 15 is, furthermore, connected to the second backup circuit 71. The second WDT 72 is, furthermore, connected to the second backup circuit 71. The second backup circuit 71 is further connected to the first MICOM 60.

The second instruction signal is input to the second MICOM 70 from the connection node between the second device resistor 25 and the second operating switch 15. Vehicle information is, furthermore, input to the second MICOM 70. Second electric current information is, furthermore, input to the second MICOM 70 from the connection node between the current output circuit 32 and detection resistor 33 of the second IPD 24.

The second MICOM 70 operates similarly to Embodiment 1. In Embodiment 2, the second MICOM 70, furthermore, operates similarly to the first MICOM 60 of Embodiment 1. Accordingly, the second device communication unit 90 of the second MICOM 70 transmits the second ON signal or the second OFF signal to the IC communication unit 51 of the second IPD 24 via the second device communication line G2, based on the input second instruction signal and vehicle information. The second control unit 93 of the second MICOM 70 determines whether communication via the second device communication line G2 is interrupted, based on the input second electric current information.

The second MICOM 70 normally outputs the low level voltage to the second backup circuit 71. The second MICOM 70, in the case of detecting that communication via the second device communication line G2 is interrupted, switches the voltage being output to the second backup circuit 71 from the low level voltage to the high level voltage.

During operation, the second MICOM 70 periodically outputs a second operation signal indicating that the second MICOM 70 is operating to the second WDT 72. Periodical output of the second operation signal stops when the second MICOM 70 stops operating. The second WDT 72 operates similarly to the first WDT 62. Here, the operation signal, the first MICOM 60 and the first device communication line G1 respectively correspond to the second operation signal, the second MICOM 70 and the second device communication line G2. Accordingly, the second WDT 72 determines whether communication via the second device communication line G2 is interrupted.

The second WDT 72 normally outputs the high level voltage to the second backup circuit 71. The second WDT 72, in the case of determining that communication via the second device communication line G2 is interrupted, switches the voltage being output to the second backup circuit 71 from the high level voltage to the low level voltage.

The second backup circuit 71 is configured similarly to the first backup circuit 61. The second WDT 72 is connected to the input end of a first inverter Q3 of the second backup circuit 71. The second MICOM 70 is connected to the other input end of an OR circuit Q2 of the second backup circuit 71. The connection node between the second device resistor 25 and the second operating switch 15 is connected to the input end of a second inverter Q4. The output end of an AND circuit Q1 is connected to the second MICOM 70.

With regard to the relationship between the components of the first backup circuit 61 and the second backup circuit 71, the first MICOM 60, the first WDT 62, the second MICOM 70 and the instruction signal respectively correspond to the second MICOM 70, the second WDT 72, the first MICOM 60 and the second instruction signal. Accordingly, when the second MICOM 70 and the second WDT 72 are respectively outputting the low level voltage and the high level voltage, the second backup circuit 71 outputs the low level voltage to the first MICOM 60 of the first power supply controller 21 regardless of the voltage shown by the instruction signal. In response to the second MICOM 70 switching the output voltage from the low level voltage to the high level voltage, or the second WDT 72 switching the output voltage from the high level voltage to the low level voltage, the second backup circuit 71 outputs, to the first MICOM 60, a voltage that depends on the instruction indicated by the second instruction signal.

When the second instruction signal instructs to turn on the power supply switch 30 of the second IPD 24, the second backup circuit 71 outputs the high level voltage to the first MICOM 60. When the second instruction signal instructs to turn off the power supply switch 30 of the second IPD 24, the second backup circuit 71 outputs the low level voltage to the first MICOM 60.

The first MICOM 60 operates similarly to Embodiment 1. The first MICOM 60, furthermore, operates similarly to the second MICOM 70 of Embodiment 2. Accordingly, when the input voltage input from the second backup circuit 71 switches from the low level voltage to the high level voltage, the first MICOM 60 transmits the second ON signal to the IC communication unit 51 of the second IPD 24 via the first device communication line G1. When the input voltage input from the second backup circuit 71 switches from the high level voltage to the low level voltage, the first MICOM 60 transmits the second OFF signal to the IC communication unit 51 of the second IPD 24 via the first device communication line G1.

Configuration of First MICOM 60

Figure 18:
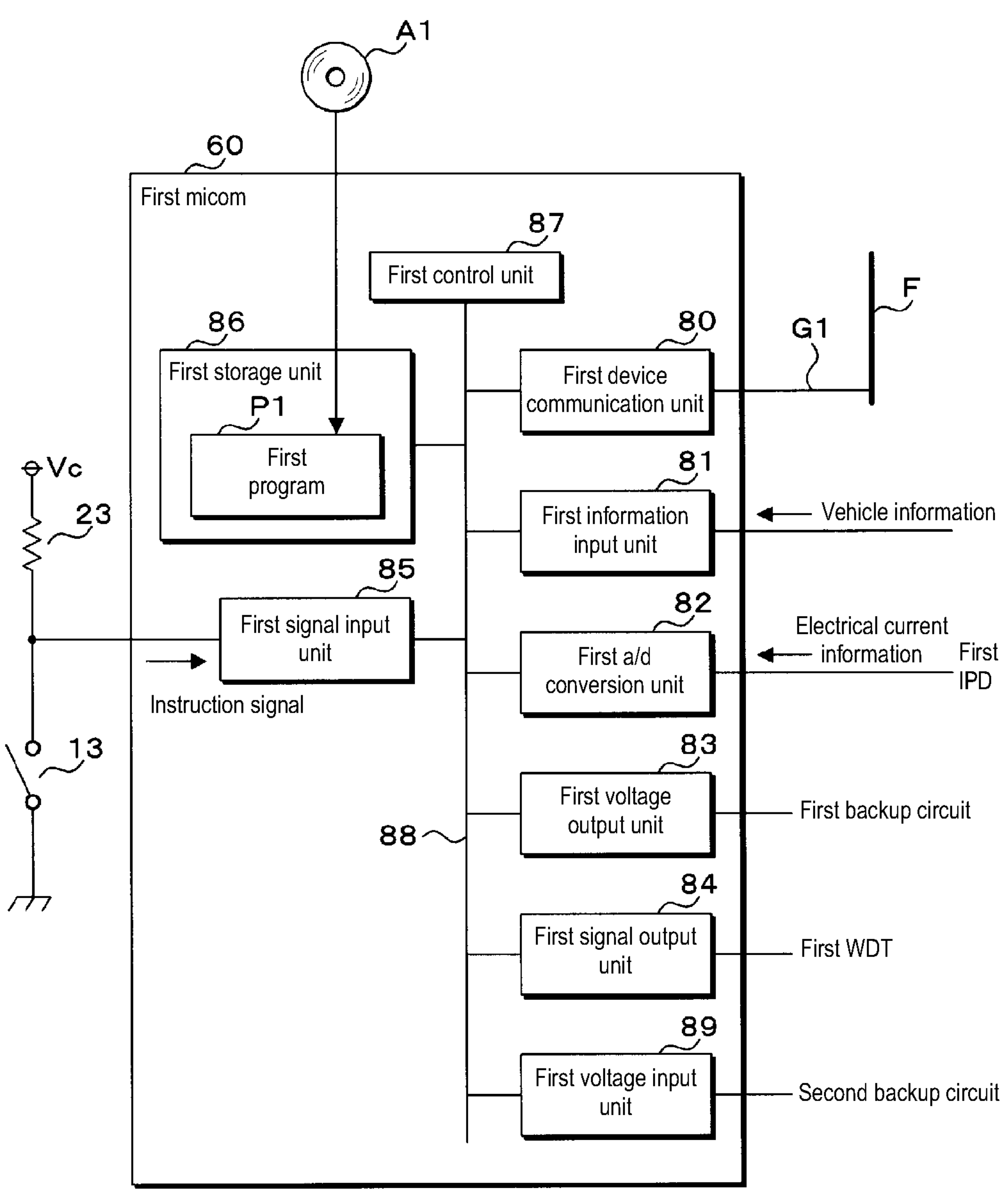
FIG. 18 is a block diagram showing the configuration of a main section of a first MICOM.

FIG. 18 is a block diagram showing the configuration of a main section of the first MICOM 60. The first MICOM 60 of Embodiment 2 similarly includes components that are provided in the first MICOM 60 of Embodiment 1. The first MICOM 60 of Embodiment 2, furthermore, includes a first voltage input unit 89. The first voltage input unit 89 is connected to a first device bus 88 and the output end of the AND circuit Q1 of the second backup circuit 71.

The first device communication unit 80 transmits the second ON signal and the second OFF signal to the IC communication unit 51 of the second IPD 24 via the first device communication line G1, the communication bus F and the second IPD communication line E2, in accordance with the instruction from the first control unit 87. The voltage output by the AND circuit Q1 of the second backup circuit 71 is input to the first voltage input unit 89.

The first control unit 87 of the first MICOM 60 executes output processing, signal transmission processing, interruption detection processing and the like by executing a first program P1, similarly to Embodiment 1. The first control unit 87, furthermore, executes substitute transmission processing, similarly to the second control unit 93 of the second MICOM 70. The substitute transmission processing that is executed by the first control unit 87 is processing in which the first device communication unit 80, instead of the second MICOM 70, transmits the second ON signal and the second OFF signal to the IC communication unit 51 of the second IPD 24. Specifically, one or a plurality of processing elements provided in the first control unit 87 execute various types of processing.

The substitute transmission processing of the first control unit 87 is similar to the substitute transmission processing of the second control unit 93. The IPD 20, the first backup circuit 61, the second device communication unit 90, the second voltage input unit 91, the second control unit 93, the ON signal and the OFF signal respectively correspond to the second IPD 24, the second backup circuit 71, the first device communication unit 80, the first voltage input unit 89, the first control unit 87, the second ON signal and the second OFF signal.

Accordingly, until interruption of communication via the second device communication line G2 is detected, the output voltage of the second backup circuit 71 is fixed to the low level voltage. Thus, until interruption of communication is detected, the first device communication unit 80 of the first MICOM 60 does not transmit the second ON signal or the second OFF signal. After interruption of communication is detected, the second backup circuit 71 outputs, to the first voltage input unit 89 of the first MICOM 60, a voltage that depends on the instruction shown by the instruction signal. The first device communication unit 80, instead of the second device communication unit 90 of the second MICOM 70, transmits the second ON signal or the second OFF signal to the IC communication unit 51 of the second IPD 24 according to the output voltage of the second backup circuit 71.

Configuration of Second MICOM 70

Figure 19:
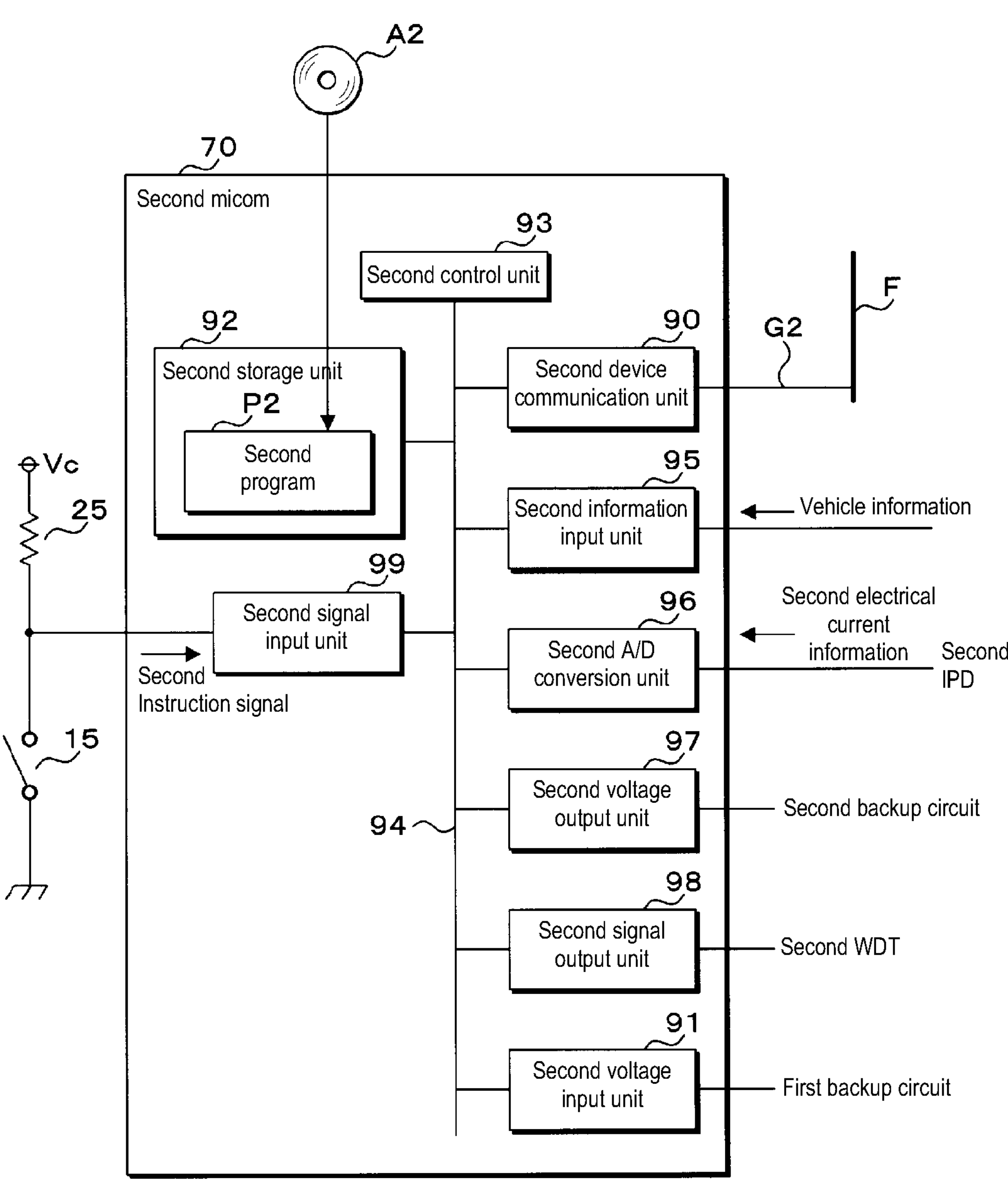
FIG. 19 is a block diagram showing the configuration of a main section of a second MICOM.

FIG. 19 is a block diagram showing the configuration of a main section of the second MICOM 70. The second MICOM 70 of Embodiment 2 similarly includes components that are provided in the second MICOM 70 of Embodiment 1. The second MICOM 70 of Embodiment 2, furthermore, includes a second information input unit 95, a second A/D conversion unit 96, a second voltage output unit 97, a second signal output unit 98 and a second signal input unit 99. These components are connected to a second device bus 94. The second device communication unit 90 transmits the second ON signal and the second OFF signal to the IC communication unit 51 of the second IPD 24 via the second device communication line G2, the communication bus F and the second IPD communication line E2, in accordance with the instruction from the second control unit 93.

The second A/D conversion unit 96 is, furthermore, connected to the connection node between the current output circuit 32 and detection resistor 33 of the second IPD 24. The second voltage output unit 97 is, furthermore, connected to the other input end of the OR circuit Q2 of the second backup circuit 71. The second signal output unit 98 is, furthermore, connected to the second WDT 72. The second signal input unit 99 is, furthermore, connected to the connection node between the second device resistor 25 and the second operating switch 15.

The vehicle information is input not only to the first information input unit 81 of the first MICOM 60 but also to the second information input unit 95 of the second MICOM 70. Analog electric current information is input to the second A/D conversion unit 96 from the connection node between the current output circuit 32 and detection resistor 33 of the second IPD 24. The second A/D conversion unit 96 converts the input analog second electric current information into digital second electric current information. The second control unit 93 acquires the digital second electric current information obtained through conversion by the second A/D conversion unit 96. As aforementioned, the second electric current information indicates the second switch current that flows through the power supply switch 30 of the second IPD 24. Acquiring the second electric current information is equivalent to acquiring the value of the second switch current.

The second voltage output unit 97 outputs the high level voltage or the low level voltage to the OR circuit Q2 of the second backup circuit 71. The second voltage output unit 97 switches the output voltage to the high level voltage or the low level voltage, in accordance with the instruction from the second control unit 93. The second signal output unit 98 outputs the second operation signal to the second WDT 72, in accordance with the instruction from the second control unit 93. The second instruction signal is input to the second signal input unit 99 from the connection node between the second device resistor 25 and the second operating switch 15.

The second control unit 93 of the second MICOM 70 executes the substitute transmission processing by executing the second program P2, similarly to Embodiment 1. The second control unit 93, furthermore, executes output processing, signal transmission processing, interruption detection processing and the like, similarly to the first control unit 87 of the first MICOM 60. The output processing of the second control unit 93 is processing for outputting the second operation signal to the second WDT 72. The signal transmission processing of the second control unit 93 is processing for transmitting the second ON signal or the second OFF signal. The interruption detection processing of the second control unit 93 is processing for detecting interruption of communication via the second device communication line G2. Specifically, one or a plurality of processing elements provided in the second control unit 93 execute various types of processing.

The output processing of the second control unit 93 is similar to the output processing of the first control unit 87. Accordingly, in the output processing of the second control unit 93, the second control unit 93 instructs the second signal output unit 98 to output the second operation signal to the second WDT 72, every time one period elapses.

The signal transmission processing of the second control unit 93 is similar to the signal transmission processing of the first control unit 87. The IPD 20, the first device communication unit 80, the first information input unit 81, the first storage unit 86, the first control unit 87, the first device communication line G1, the ON signal, the OFF signal and the instruction signal respectively correspond to the second IPD 24, the second device communication unit 90, the second information input unit 95, the second storage unit 92, the second control unit 93, the second device communication line G2, the second ON signal, the second OFF signal and the second instruction signal.

The power supply switch 30 referred to the description of the signal transmission processing of the second control unit 93 is the power supply switch 30 provided in the second IPD 24. The value of the state flag that is stored in the second storage unit 92 is changed to 1 by the second control unit 93, when the second control unit 93 instructs the second ON signal to the second device communication unit 90. The value of the state flag that is stored in the second storage unit 92 is changed to zero by the second control unit 93, when the second control unit 93 instructs the second OFF signal to the second device communication unit 90.

Accordingly, when the second instruction signal instructs to turn on the power supply switch 30 of the second IPD 24, the second device communication unit 90 transmits the second ON signal to the IC communication unit 51 of the second IPD 24. The drive circuit 40 of the second IPD 24 thereby turns on the power supply switch 30 of the second IPD 24. When the second instruction signal instructs to turn off the power supply switch 30 of the second IPD 24, the second device communication unit 90 transmits the second OFF signal to the IC communication unit 51 of the second IPD 24. The drive circuit 40 of the second IPD 24 thereby turns off the power supply switch 30 of the second IPD 24.

The interruption detection processing of the second control unit 93 is similar to the interruption detection processing of the first control unit 87. The IPD 20, the first device communication unit 80, the first A/D conversion unit 82, the first voltage output unit 83, the first control unit 87, the first device communication line G1, the electric current information and the switch current respectively correspond to the second IPD 24, the second device communication unit 90, the second A/D conversion unit 96, the second voltage output unit 97, the second control unit 93, the second device communication line G2, the second electric current information and the second switch current. In the interruption detection processing of the second control unit 93, the value of the state flag that is stored in the second storage unit 92 is used.

Accordingly, the second control unit 93 determines whether communication via the second device communication line G2 is interrupted, based on the value of the state flag that is stored in the second storage unit 92 and the second switch current. The second control unit 93 functions as a second determination unit. The second control unit 93, in the case of determining that communication via the second device communication line G2 is interrupted, instructs the second voltage output unit 97 to switch the output voltage being output to the second backup circuit 71 from the low level voltage to the high level voltage. The second backup circuit 71 thereby outputs, to the first voltage input unit 89 of the first MICOM 60 of the first power supply controller 21, a voltage that depends on the instruction of the instruction signal. The first device communication unit 80 of the first MICOM 60, instead of the second device communication unit 90 of the second MICOM 70, transmits the second ON signal and the second OFF signal to the IC communication unit 51 of the second IPD 24.

Effects of Power Supply Control Device 10

The first MICOM 60 and the second MICOM 70 operate similarly to Embodiment 1. Accordingly, when communication via the first device communication line G1 is interrupted, the second device communication unit 90 of the second MICOM 70, instead of the first device communication unit 80 of the first MICOM 60, transmits the ON signal or the OFF signal to the IC communication unit 51 of the IPD 20 via the second device communication line G2. Thus, even if communication via the first device communication line G1 is interrupted, the drive circuit 40 of the IPD 20 is able to turn the power supply switch 30 on or off.

Furthermore, the first MICOM 60 of Embodiment 2 operates similarly to the second MICOM 70 of Embodiment 1. The second MICOM 70 of Embodiment 2 operates similarly to the first MICOM 60 of Embodiment 1. Accordingly, when communication via the second device communication line G2 is interrupted, the first device communication unit 80 of the first MICOM 60, instead of the second device communication unit 90 of the second MICOM 70, transmits the second ON signal or the second OFF signal to the IC communication unit 51 of the second IPD 24 via the first device communication line G1. Thus, even if communication via the second device communication line G2 is interrupted, the drive circuit 40 of the second IPD 24 is able to turn the power supply switch 30 of the second IPD 24 on or off.

The power supply control device 10 of Embodiment 2 similarly achieves the effects that are achieved by the power supply control device 10 of Embodiment 1.

Modifications of Embodiments 1 and 2

In Embodiments 1 and 2, the first control unit 87 of the first MICOM 60 detects that communication via the first device communication line G1 is interrupted, based on the value of the state flag of the first storage unit 86 and the switch current that flows through the power supply switch 30 of the IPD 20. A different value from the switch current may be used, when the first control unit 87 detects interruption of communication. The first control unit 87 may, for example, detect interruption of communication based on the voltage of the source of the power supply switch 30 of the IPD 20, instead of the switch current. The reference potential of the voltage of the source is ground potential.

In the IPD 20, when the power supply switch 30 is off, the voltage of the source of the power supply switch 30 is zero V. When the power supply switch 30 is on, the voltage of the source of the power supply switch 30 is the end-to-end voltage of the DC power source 11. The first control unit 87 detects interruption of communication, when the voltage of the source of the power supply switch 30 of the IPD 20 is greater than or equal to a fixed first voltage despite the value of the state flag being zero. The first control unit 87 detects interruption of communication, when the voltage of the source of the power supply switch 30 of the IPD 20 is less than a fixed second voltage despite the value of the state flag being 1. The first voltage and the second voltage are each a positive value near zero V. The first voltage may be the same as or different from the second voltage.

Similarly, in Embodiment 2, the second control unit 93 of the second MICOM 70 detects that communication via the second device communication line G2 is interrupted, based on the value of the state flag of the second storage unit 92 and the second switch current that flows through the power supply switch 30 of the second IPD 24. A different value from the second switch current may be used, when the second control unit 93 detects interruption of communication. The second control unit 93 may, for example, detect interruption of communication, based on the voltage of the source of the power supply switch 30 of the second IPD 24, instead of the second switch current. The reference potential of the voltage of the source is ground potential.

In the second IPD 24, when the power supply switch 30 is off, the voltage of the source of the power supply switch 30 is zero V. When the power supply switch 30 is on, the voltage of the source of the power supply switch 30 is the end-to-end voltage of the DC power source 11. The second control unit 93 detects interruption of communication, when the voltage of the source of the power supply switch 30 of the second IPD 24 is greater than or equal to a fixed first voltage despite the value of the state flag being zero. The second control unit 93 detects interruption of communication, when the voltage of the source of the power supply switch 30 of the second IPD 24 is less than a fixed second voltage despite the value of the state flag being 1.

The respective power supply switches 30 of the IPD 20 and the second IPD 24 need only function as switches. The power supply switches 30 are thus not limited to N-channel FETs, and may be P-channel FETs, bipolar transistors or the like. The instruction signal is not limited to a signal that is output from the connection node between the device resistor 23 and the operating switch 13, and may be, for example, a signal that is output by an electrical device not shown installed in the vehicle C. Similarly, the second instruction signal is not limited to a signal that is output from the connection node between the second device resistor 25 and the second operating switch 15, and may be, for example, a signal that is output by an electrical device installed in the vehicle C.

Embodiments 1 and 2 disclosed herein are considered in all respects to be illustrative and not restrictive. The scope of the disclosure is indicated by the claims rather than by the foregoing description, and all changes that come within the meaning and range of equivalency of the claims are intended to be embraced therein.

The invention claimed is:

1. A power supply control device for controlling power supplied via a first power supply switch, comprising:

a switcher configured to turn the first power supply switch on or off;

a first communication unit configured to transmit an ON signal instructing to turn on the first power supply switch and an OFF signal instructing to turn off the first power supply switch to the switcher via a first communication line;

a determination unit configured to determine whether communication via the first communication line is interrupted; and a second communication unit, different than the first communication unit and configured to transmit the ON signal and the OFF signal to the switcher via a second communication line, when it is determined by the determination unit that the interruption has occurred in the first communication line.

2. The power supply control device according to claim 1, further including;

a communication bus connected to the switcher, the first communication line and the second communication line, wherein the first communication unit and the second communication unit each transmit the ON signal or the OFF signal to the switcher via the communication bus, the first communication unit and the second communication unit are disposed on a first board, and the switcher and the communication bus are disposed on a second board.

3. The power supply control device according to claim 1, further including;

an instruction unit configured to instruct the first communication unit to transmit the ON signal or the OFF signal; and an acquisition unit configured to acquire a value of a switch current flowing through the first power supply switch, wherein the determination unit determines that the interruption has occurred, if the value of the switch current acquired by the acquisition unit is less than a predetermined current value despite the instruction unit instructing the first communication unit to transmit the ON signal.

4. The power supply control device according to claim 1, further including;

an instruction unit configured to instruct the first communication unit to transmit the ON signal or the OFF signal; and an acquisition unit configured to acquire a value of a switch current flowing through the first, wherein the determination unit determines that the interruption has occurred, if the value of the switch current acquired by the acquisition unit is greater than or equal to a second predetermined current value despite the instruction unit instructing the first communication unit to transmit the OFF signal.

5. The power supply control device according to claim 1, further including;

an instruction unit configured to instruct the first communication unit to transmit the ON signal or the OFF signal, wherein the determination unit determines that the interruption has occurred, if the instruction unit stops operating.

6. The power supply control device according to claim 1, further including;

a second power supply switch disposed on a second current path different from a first current path of the current flowing through the first power supply switch;

a second switcher configured to turn the second power supply switch on or off; and a second determination unit configured to determine whether communication is interrupted, wherein the second communication unit transmits a second ON signal instructing to turn on the second power supply switch and a second OFF signal instructing to turn off the second power supply switch to the second switcher via the second communication line, the second determination unit determines whether communication via the second communication line is interrupted, and the first communication unit transmits the second ON signal and the second OFF signal to the second switcher, if it is determined by the second determination unit that communication via the second communication line is interrupted.

7. A power supply control method for controlling power supplied via a first power supply switch, comprising:

transmitting an ON signal instructing to turn on the first power supply switch and an OFF signal instructing to turn off the first power supply switch to a switcher configured to turn the first power supply switch on or off, via a first communication line;

determining whether communication via the first communication line is interrupted; and transmitting the ON signal and the OFF signal to the switcher via a second communication line, if it is determined that the interruption has occurred in the first communication line.

8. The power supply control device according to claim 2, further including;

an instruction unit configured to instruct the first communication unit to transmit the ON signal or the OFF signal; and an acquisition unit configured to acquire a value of a switch current flowing through the first power supply switch, wherein the determination unit determines that the interruption has occurred, if the value of the switch current acquired by the acquisition unit is less than a predetermined current value despite the instruction unit instructing the first communication unit to transmit the ON signal.

9. The power supply control device according to claim 2, further including;

an instruction unit configured to instruct the first communication unit to transmit the ON signal or the OFF signal; and an acquisition unit configured to acquire a value of a switch current flowing through the first power supply switch, wherein the determination unit determines that the interruption has occurred, if the value of the switch current acquired by the acquisition unit is greater than or equal to a second predetermined current value despite the instruction unit instructing the first communication unit to transmit the OFF signal.

10. The power supply control device according to claim 3, further including;

an instruction unit configured to instruct the first communication unit to transmit the ON signal or the OFF signal; and an acquisition unit configured to acquire a value of a switch current flowing through the first power supply switch, wherein the determination unit determines that the interruption has occurred, if the value of the switch current acquired by the acquisition unit is greater than or equal to a second predetermined current value despite the instruction unit instructing the first communication unit to transmit the OFF signal.

11. The power supply control device according to claim 2, further including;

an instruction unit configured to instruct the first communication unit to transmit the ON signal or the OFF signal, wherein the determination unit determines that the interruption has occurred, if the instruction unit stops operating.

12. The power supply control device according to claim 3, further including;

an instruction unit configured to instruct the first communication unit to transmit the ON signal or the OFF signal, wherein the determination unit determines that the interruption has occurred, if the instruction unit stops operating.

13. The power supply control device according to claim 4, further including;

an instruction unit configured to instruct the first communication unit to transmit the ON signal or the OFF signal, wherein the determination unit determines that the interruption has occurred, if the instruction unit stops operating.

14. The power supply control device according to claim 2, further including;

a second power supply switch disposed on a second current path different from a first current path of the current flowing through the first power supply switch;

a second switcher configured to turn the second power supply switch on or off; and a second determination unit configured to determine whether communication is interrupted, wherein the second communication unit transmits a second ON signal instructing to turn on the second power supply switch and a second OFF signal instructing to turn off the second power supply switch to the second switcher via the second communication line, the second determination unit determines whether communication via the second communication line is interrupted, and the first communication unit transmits the second ON signal and the second OFF signal to the second switcher, if it is determined by the second determination unit that communication via the second communication line is interrupted.

15. The power supply control device according to claim 3, further including;

a second power supply switch disposed on a second current path different from a first current path of the current flowing through the first power supply switch;

a second switcher configured to turn the second power supply switch on or off; and a second determination unit configured to determine whether communication is interrupted, wherein the second communication unit transmits a second ON signal instructing to turn on the second power supply switch and a second OFF signal instructing to turn off the second power supply switch to the second switcher via the second communication line, the second determination unit determines whether communication via the second communication line is interrupted, and the first communication unit transmits the second ON signal and the second OFF signal to the second switcher, if it is determined by the second determination unit that communication via the second communication line is interrupted.

16. The power supply control device according to claim 4, further including;

a second power supply switch disposed on a second current path different from a first current path of the current flowing through the first power supply switch;

a second switcher configured to turn the second power supply switch on or off, and a second determination unit configured to determine whether communication is interrupted, wherein the second communication unit transmits a second ON signal instructing to turn on the second power supply switch and a second OFF signal instructing to turn off the second power supply switch to the second switcher via the second communication line, the second determination unit determines whether communication via the second communication line is interrupted, and the first communication unit transmits the second ON signal and the second OFF signal to the second switcher, if it is determined by the second determination unit that communication via the second communication line is interrupted.

17. The power supply control device according to claim 5, further including;

a second power supply switch disposed on a second current path different from a first current path of the current flowing through the first power supply switch;

a second switcher configured to turn the second power supply switch on or off; and a second determination unit configured to determine whether communication is interrupted, wherein the second communication unit transmits a second ON signal instructing to turn on the second power supply switch and a second OFF signal instructing to turn off the second power supply switch to the second switcher via the second communication line, the second determination unit determines whether communication via the second communication line is interrupted, and the first communication unit transmits the second ON signal and the second OFF signal to the second switcher, if it is determined by the second determination unit that communication via the second communication line is interrupted.

* * * * *